United States Patent
Meyer et al.

(10) Patent No.: US 12,458,417 B2
(45) Date of Patent: Nov. 4, 2025

(54) INTERMEDULLARY LENGTHENING IMPLANT WITH INTEGRATED LOAD SENSOR

(71) Applicant: NuVasive Specialized Orthopedics, Inc., San Diego, CA (US)

(72) Inventors: Nathan Meyer, Vista, CA (US); Youngsam Bae, Placentia, CA (US)

(73) Assignee: Nuvasive Specialized Orthopedics Inc., San Diego, CA (US)

( * ) Notice: Subject to any disclaimer, the term of this patent is extended or adjusted under 35 U.S.C. 154(b) by 26 days.

(21) Appl. No.: 17/887,789

(22) Filed: Aug. 15, 2022

(65) Prior Publication Data
US 2024/0050134 A1 Feb. 15, 2024

(51) Int. Cl.
| | |
|---|---|
| A61B 17/72 | (2006.01) |
| A61B 17/00 | (2006.01) |
| A61B 17/56 | (2006.01) |
| A61B 90/00 | (2016.01) |

(52) U.S. Cl.
CPC ........... *A61B 17/7216* (2013.01); *A61B 2017/00221* (2013.01); *A61B 2017/00398* (2013.01); *A61B 2017/564* (2013.01); *A61B 2090/064* (2016.02); *A61B 2562/0252* (2013.01)

(58) Field of Classification Search
CPC ............ A61B 17/7216; A61B 17/7225; A61B 17/7241; A61B 17/7016
See application file for complete search history.

(56) References Cited

U.S. PATENT DOCUMENTS

| | | |
|---|---|---|
| 2,702,031 A | 2/1955 | Wenger |
| 3,111,945 A | 11/1963 | Von Solbrig |
| 3,372,476 A | 3/1968 | Peiffer |
| 3,377,576 A | 4/1968 | Langberg |
| 3,512,901 A | 5/1970 | Law |
| 3,597,781 A | 8/1971 | Eibes |
| 3,900,025 A | 8/1975 | Barnes, Jr. |
| 3,915,151 A | 10/1975 | Kraus |

(Continued)

FOREIGN PATENT DOCUMENTS

| | | |
|---|---|---|
| CN | 1697630 A | 11/2005 |
| CN | 101040807 A | 9/2007 |

(Continued)

OTHER PUBLICATIONS

Abe et al., "Experimental external fixation combined with percutaneous discectomy in the management of scoliosis.", Spine, 1999, pp. 646-653, 24, No. 7.

(Continued)

*Primary Examiner* — Eduardo C Robert
*Assistant Examiner* — Holly Joanna Lane

(57) ABSTRACT

Various implementations include implants and related methods for moving bone. Certain implementations include an implant for moving bone in a patient's body, the implant including: an implantable biocompatible housing; a first adjustment rod at least partially overlapping the implantable biocompatible housing; a driver configured to drive the first adjustment rod to enable movement of the first adjustment rod relative to the housing; and a load sensor positioned within the housing and configured to indicate a load applied by the driver on the first adjustment rod.

18 Claims, 17 Drawing Sheets

(56) References Cited

U.S. PATENT DOCUMENTS

| | | |
|---|---|---|
| RE28,907 E | 7/1976 | Eibes et al. |
| 3,976,060 A | 8/1976 | Hildebrandt et al. |
| 4,010,758 A | 3/1977 | Rockland et al. |
| 4,056,743 A | 11/1977 | Clifford et al. |
| 4,068,821 A | 1/1978 | Morrison |
| 4,078,559 A | 3/1978 | Nissinen |
| 4,204,541 A | 5/1980 | Kapitanov |
| 4,357,946 A | 11/1982 | Dutcher et al. |
| 4,386,603 A | 6/1983 | Mayfield |
| 4,448,191 A | 5/1984 | Rodnyansky et al. |
| 4,486,176 A | 12/1984 | Tardieu et al. |
| 4,501,266 A | 2/1985 | McDaniel |
| 4,522,501 A | 6/1985 | Shannon |
| 4,537,520 A | 8/1985 | Ochiai et al. |
| 4,550,279 A | 10/1985 | Klein |
| 4,561,798 A | 12/1985 | Elcrin et al. |
| 4,573,454 A | 3/1986 | Hoffman |
| 4,592,355 A | 6/1986 | Antebi |
| 4,595,007 A | 6/1986 | Mericle |
| 4,642,257 A | 2/1987 | Chase |
| 4,658,809 A | 4/1987 | Ulrich et al. |
| 4,700,091 A | 10/1987 | Wuthrich |
| 4,747,832 A | 5/1988 | Buffet |
| 4,854,304 A | 8/1989 | Zielke |
| 4,904,861 A | 2/1990 | Epstein et al. |
| 4,931,055 A | 6/1990 | Bumpus et al. |
| 4,940,467 A | 7/1990 | Tronzo |
| 4,957,495 A | 9/1990 | Kluger |
| 4,973,331 A | 11/1990 | Pursley et al. |
| 5,010,879 A | 4/1991 | Moriya et al. |
| 5,030,235 A | 7/1991 | Campbell, Jr. |
| 5,041,112 A | 8/1991 | Mingozzi et al. |
| 5,064,004 A | 11/1991 | Lundell |
| 5,074,882 A | 12/1991 | Grammont et al. |
| 5,092,889 A | 3/1992 | Campbell, Jr. |
| 5,133,716 A | 7/1992 | Plaza |
| 5,142,407 A | 8/1992 | Varaprasad et al. |
| 5,156,605 A | 10/1992 | Pursley et al. |
| 5,263,955 A | 11/1993 | Baumgart et al. |
| 5,290,289 A | 3/1994 | Sanders et al. |
| 5,304,210 A | 4/1994 | Crook |
| 5,306,275 A | 4/1994 | Bryan |
| 5,330,503 A | 7/1994 | Yoon |
| 5,334,202 A | 8/1994 | Carter |
| 5,336,223 A | 8/1994 | Rogers |
| 5,356,411 A | 10/1994 | Spievack |
| 5,356,424 A | 10/1994 | Buzerak et al. |
| 5,364,396 A | 11/1994 | Robinson et al. |
| 5,403,322 A | 4/1995 | Herzenberg et al. |
| 5,429,638 A | 7/1995 | Muschler et al. |
| 5,437,266 A | 8/1995 | McPherson et al. |
| 5,456,724 A | 10/1995 | Yen et al. |
| 5,466,261 A | 11/1995 | Richelsoph |
| 5,468,030 A | 11/1995 | Walling |
| 5,480,437 A | 1/1996 | Draenert |
| 5,509,888 A | 4/1996 | Miller |
| 5,516,335 A | 5/1996 | Kummer et al. |
| 5,527,309 A | 6/1996 | Shelton |
| 5,536,269 A | 7/1996 | Spievack |
| 5,549,610 A | 8/1996 | Russell et al. |
| 5,573,012 A | 11/1996 | McEwan |
| 5,575,790 A | 11/1996 | Chen et al. |
| 5,582,616 A | 12/1996 | Bolduc et al. |
| 5,620,445 A | 4/1997 | Brosnahan et al. |
| 5,620,449 A | 4/1997 | Faccioli et al. |
| 5,626,579 A | 5/1997 | Muschler et al. |
| 5,626,613 A | 5/1997 | Schmieding |
| 5,632,744 A | 5/1997 | Campbell, Jr. |
| 5,659,217 A | 8/1997 | Petersen |
| 5,662,683 A | 9/1997 | Kay |
| 5,672,175 A | 9/1997 | Martin |
| 5,672,177 A | 9/1997 | Seldin |
| 5,700,263 A | 12/1997 | Schendel |
| 5,704,938 A | 1/1998 | Staehlin et al. |
| 5,704,939 A | 1/1998 | Justin |
| 5,720,746 A | 2/1998 | Soubeiran |
| 5,743,910 A | 4/1998 | Bays et al. |
| 5,762,599 A | 6/1998 | Sohn |
| 5,771,903 A | 6/1998 | Jakobsson |
| 5,810,815 A | 9/1998 | Morales |
| 5,827,286 A | 10/1998 | Incavo et al. |
| 5,830,221 A | 11/1998 | Stein et al. |
| 5,879,375 A | 3/1999 | Larson, Jr. et al. |
| 5,902,304 A | 5/1999 | Walker et al. |
| 5,935,127 A | 8/1999 | Border |
| 5,945,762 A | 8/1999 | Chen et al. |
| 5,961,553 A | 10/1999 | Coty et al. |
| 5,976,138 A | 11/1999 | Baumgart et al. |
| 5,979,456 A | 11/1999 | Magovern |
| 6,022,349 A | 2/2000 | McLeod et al. |
| 6,033,412 A | 3/2000 | Losken et al. |
| 6,034,296 A | 3/2000 | Elvin et al. |
| 6,102,922 A | 8/2000 | Jakobsson et al. |
| 6,106,525 A | 8/2000 | Sachse |
| 6,120,509 A | 9/2000 | Michelson et al. |
| 6,126,660 A | 10/2000 | Dietz |
| 6,126,661 A | 10/2000 | Faccioli et al. |
| 6,138,681 A | 10/2000 | Chen et al. |
| 6,139,316 A | 10/2000 | Sachdeva et al. |
| 6,162,223 A | 12/2000 | Orsak et al. |
| 6,183,476 B1 | 2/2001 | Gerhardt et al. |
| 6,200,317 B1 | 3/2001 | Aalsma et al. |
| 6,234,956 B1 | 5/2001 | He et al. |
| 6,241,730 B1 | 6/2001 | Alby |
| 6,245,075 B1 | 6/2001 | Betz et al. |
| 6,315,784 B1 | 11/2001 | Djurovic |
| 6,319,255 B1 | 11/2001 | Grundei et al. |
| 6,331,744 B1 | 12/2001 | Chen et al. |
| 6,336,929 B1 | 1/2002 | Justin |
| 6,343,568 B1 | 2/2002 | McClasky |
| 6,358,283 B1 | 3/2002 | Hogfors et al. |
| 6,375,682 B1 | 4/2002 | Fleischmann et al. |
| 6,389,187 B1 | 5/2002 | Greenaway et al. |
| 6,400,980 B1 * | 6/2002 | Lemelson ...... A61B 17/320758 600/478 |
| 6,402,753 B1 | 6/2002 | Cole et al. |
| 6,409,175 B1 | 6/2002 | Evans et al. |
| 6,416,516 B1 | 7/2002 | Stauch et al. |
| 6,499,488 B1 | 12/2002 | Hunter et al. |
| 6,499,907 B1 | 12/2002 | Baur |
| 6,500,110 B1 | 12/2002 | Davey et al. |
| 6,508,820 B2 | 1/2003 | Bales |
| 6,510,345 B1 | 1/2003 | Van Bentem |
| 6,537,196 B1 | 3/2003 | Creighton, IV et al. |
| 6,554,831 B1 | 4/2003 | Rivard et al. |
| 6,565,573 B1 | 5/2003 | Ferrante et al. |
| 6,565,576 B1 | 5/2003 | Stauch et al. |
| 6,582,313 B2 | 6/2003 | Perrow |
| 6,583,630 B2 | 6/2003 | Mendes et al. |
| 6,605,089 B1 | 8/2003 | Michelson |
| 6,616,669 B2 | 9/2003 | Ogilvie et al. |
| 6,626,917 B1 | 9/2003 | Craig |
| 6,656,135 B2 | 12/2003 | Zogbi et al. |
| 6,656,194 B1 | 12/2003 | Gannoe et al. |
| 6,667,725 B1 | 12/2003 | Simons et al. |
| 6,673,079 B1 | 1/2004 | Kane |
| 6,702,816 B2 | 3/2004 | Buhler |
| 6,706,005 B2 | 3/2004 | Roy et al. |
| 6,706,042 B2 | 3/2004 | Taylor |
| 6,709,293 B2 | 3/2004 | Mori et al. |
| 6,730,087 B1 | 5/2004 | Butsch |
| 6,761,503 B2 | 7/2004 | Breese |
| 6,769,499 B2 | 8/2004 | Cargill et al. |
| 6,789,442 B2 | 9/2004 | Forch |
| 6,796,984 B2 | 9/2004 | Soubeiran |
| 6,802,844 B2 | 10/2004 | Ferree |
| 6,809,434 B1 | 10/2004 | Duncan et al. |
| 6,835,207 B2 | 12/2004 | Zacouto et al. |
| 6,852,113 B2 | 2/2005 | Nathanson et al. |
| 6,918,838 B2 | 7/2005 | Schwarzler et al. |
| 6,918,910 B2 | 7/2005 | Smith et al. |
| 6,921,400 B2 | 7/2005 | Sohngen |
| 6,923,951 B2 | 8/2005 | Contag et al. |
| 6,971,143 B2 | 12/2005 | Domroese |

(56) References Cited

U.S. PATENT DOCUMENTS

| | | |
|---|---|---|
| 7,001,346 B2 | 2/2006 | White |
| 7,007,699 B2 | 3/2006 | Martinelli et al. |
| 7,008,425 B2 | 3/2006 | Phillips |
| 7,011,658 B2 | 3/2006 | Young |
| 7,029,472 B1 | 4/2006 | Fortin |
| 7,029,475 B2 | 4/2006 | Panjabi |
| 7,041,105 B2 | 5/2006 | Michelson |
| 7,060,080 B2 | 6/2006 | Bachmann |
| 7,063,706 B2 | 6/2006 | Wittenstein |
| 7,105,029 B2 | 9/2006 | Doubler et al. |
| 7,105,968 B2 | 9/2006 | Nissen |
| 7,114,501 B2 | 10/2006 | Johnson et al. |
| 7,115,129 B2 | 10/2006 | Heggeness |
| 7,135,022 B2 | 11/2006 | Kosashvili et al. |
| 7,160,312 B2 | 1/2007 | Saadat |
| 7,163,538 B2 | 1/2007 | Altarac et al. |
| 7,172,594 B2 | 2/2007 | Biscup |
| 7,182,736 B2 | 2/2007 | Roy et al. |
| 7,189,005 B2 | 3/2007 | Ward |
| 7,191,007 B2 | 3/2007 | Desai et al. |
| 7,218,232 B2 | 5/2007 | DiSilvestro et al. |
| 7,238,191 B2 | 7/2007 | Bachmann |
| 7,241,300 B2 | 7/2007 | Sharkawy et al. |
| 7,243,719 B2 | 7/2007 | Baron et al. |
| 7,255,682 B1 | 8/2007 | Bartol, Jr. et al. |
| 7,282,023 B2 | 10/2007 | Frering |
| 7,285,087 B2 | 10/2007 | Moaddeb et al. |
| 7,302,015 B2 | 11/2007 | Kim et al. |
| 7,302,858 B2 | 12/2007 | Walsh et al. |
| 7,314,443 B2 | 1/2008 | Jordan et al. |
| 7,333,013 B2 | 2/2008 | Berger |
| 7,351,244 B2 | 4/2008 | Hamada |
| 7,357,037 B2 | 4/2008 | Hnat et al. |
| 7,357,635 B2 | 4/2008 | Belfor et al. |
| 7,360,542 B2 | 4/2008 | Nelson et al. |
| 7,390,007 B2 | 6/2008 | Helms et al. |
| 7,390,294 B2 | 6/2008 | Hassler, Jr. |
| 7,402,134 B2 | 7/2008 | Moaddeb et al. |
| 7,402,176 B2 | 7/2008 | Malek |
| 7,429,259 B2 | 9/2008 | Cadeddu et al. |
| 7,445,010 B2 | 11/2008 | Kugler et al. |
| 7,455,672 B2 | 11/2008 | Michelson |
| 7,458,981 B2 | 12/2008 | Fielding et al. |
| 7,485,149 B1 | 2/2009 | White |
| 7,489,495 B2 | 2/2009 | Stevenson |
| 7,491,179 B2 | 2/2009 | Roy et al. |
| 7,530,981 B2 | 5/2009 | Kutsenko |
| 7,531,002 B2 | 5/2009 | Sutton et al. |
| 7,553,298 B2 | 6/2009 | Hunt et al. |
| 7,561,916 B2 | 7/2009 | Hunt et al. |
| 7,611,526 B2 | 11/2009 | Carl et al. |
| 7,615,070 B2 | 11/2009 | Biscup |
| 7,618,435 B2 | 11/2009 | Opolski |
| 7,658,754 B2 | 2/2010 | Zhang et al. |
| 7,666,184 B2 | 2/2010 | Stauch |
| 7,666,210 B2 | 2/2010 | Franck et al. |
| 7,678,136 B2 | 3/2010 | Doubler et al. |
| 7,678,139 B2 | 3/2010 | Garamszegi et al. |
| 7,708,737 B2 | 5/2010 | Kraft et al. |
| 7,708,762 B2 | 5/2010 | McCarthy et al. |
| 7,727,143 B2 | 6/2010 | Birk et al. |
| 7,753,913 B2 | 7/2010 | Szakelyhidi, Jr. et al. |
| 7,753,915 B1 | 7/2010 | Eksler et al. |
| 7,756,579 B2 | 7/2010 | Nitzan et al. |
| 7,762,998 B2 | 7/2010 | Birk et al. |
| 7,763,075 B2 | 7/2010 | Navarro et al. |
| 7,763,076 B2 | 7/2010 | Navarro et al. |
| 7,763,080 B2 | 7/2010 | Southworth |
| 7,766,855 B2 | 8/2010 | Miethke |
| 7,771,478 B2 | 8/2010 | Navarro et al. |
| 7,771,480 B2 | 8/2010 | Navarro et al. |
| 7,775,215 B2 | 8/2010 | Hassler, Jr. et al. |
| 7,776,068 B2 | 8/2010 | Ainsworth et al. |
| 7,776,075 B2 | 8/2010 | Bruneau et al. |
| 7,787,958 B2 | 8/2010 | Stevenson |
| 7,794,476 B2 | 9/2010 | Wisnewski |
| 7,794,499 B2 | 9/2010 | Navarro et al. |
| 7,806,935 B2 | 10/2010 | Navarro et al. |
| 7,811,328 B2 | 10/2010 | Molz, IV et al. |
| 7,822,465 B2 | 10/2010 | Carls et al. |
| 7,835,779 B2 | 11/2010 | Anderson et al. |
| 7,837,691 B2 | 11/2010 | Cordes et al. |
| 7,862,586 B2 | 1/2011 | Malek |
| 7,867,235 B2 | 1/2011 | Fell et al. |
| 7,875,033 B2 | 1/2011 | Richter et al. |
| 7,878,988 B2 | 2/2011 | Bush et al. |
| 7,901,381 B2 | 3/2011 | Birk et al. |
| 7,909,852 B2 | 3/2011 | Boomer et al. |
| 7,918,844 B2 | 4/2011 | Byrum et al. |
| 7,935,116 B2 | 5/2011 | Michelson |
| 7,938,831 B2 | 5/2011 | Leroux et al. |
| 7,938,841 B2 | 5/2011 | Sharkawy et al. |
| 7,955,357 B2 | 6/2011 | Kiester |
| 7,981,144 B2 | 7/2011 | Geist et al. |
| 7,985,256 B2 | 7/2011 | Grotz et al. |
| 7,988,709 B2 | 8/2011 | Clark et al. |
| 7,993,269 B2 | 8/2011 | Donofrio et al. |
| 8,002,809 B2 | 8/2011 | Baynham |
| 8,011,308 B2 | 9/2011 | Picchio |
| 8,016,859 B2 | 9/2011 | Donofrio et al. |
| 8,026,729 B2 | 9/2011 | Kroh et al. |
| 8,034,080 B2 | 10/2011 | Malandain et al. |
| 8,043,299 B2 | 10/2011 | Conway |
| 8,043,338 B2 | 10/2011 | Dant |
| 8,057,473 B2 | 11/2011 | Orsak et al. |
| 8,057,513 B2 | 11/2011 | Kohm et al. |
| 8,066,650 B2 | 11/2011 | Lee et al. |
| 8,070,695 B2 | 12/2011 | Gupta et al. |
| 8,075,601 B2 | 12/2011 | Young |
| 8,083,741 B2 | 12/2011 | Morgan et al. |
| 8,092,499 B1 | 1/2012 | Roth |
| 8,095,317 B2 | 1/2012 | Ekseth et al. |
| 8,105,360 B1 | 1/2012 | Connor |
| 8,114,158 B2 | 2/2012 | Carl et al. |
| 8,123,805 B2 | 2/2012 | Makower et al. |
| 8,133,280 B2 | 3/2012 | Voellmicke et al. |
| 8,147,549 B2 | 4/2012 | Metcalf, Jr. et al. |
| 8,162,897 B2 | 4/2012 | Byrum |
| 8,162,979 B2 | 4/2012 | Sachs et al. |
| 8,177,789 B2 | 5/2012 | Magill et al. |
| 8,197,490 B2 | 6/2012 | Pool et al. |
| 8,206,387 B2 | 6/2012 | Michelson |
| 8,211,149 B2 | 7/2012 | Justis |
| 8,211,151 B2 | 7/2012 | Schwab et al. |
| 8,216,279 B2 | 7/2012 | Bruneau et al. |
| 8,221,420 B2 | 7/2012 | Keller |
| 8,226,690 B2 | 7/2012 | Altarac et al. |
| 8,236,002 B2 | 8/2012 | Fortin et al. |
| 8,237,451 B2 | 8/2012 | Joy et al. |
| 8,241,331 B2 | 8/2012 | Arnin |
| 8,246,630 B2 | 8/2012 | Manzi et al. |
| 8,252,063 B2 | 8/2012 | Stauch |
| 8,267,969 B2 | 9/2012 | Altarac et al. |
| 8,278,941 B2 | 10/2012 | Kroh et al. |
| 8,282,671 B2 | 10/2012 | Connor |
| 8,323,290 B2 | 12/2012 | Metzger et al. |
| 8,343,153 B2 | 1/2013 | Duda et al. |
| 8,343,192 B2 | 1/2013 | Kiester |
| 8,357,182 B2 | 1/2013 | Seme |
| 8,366,628 B2 | 2/2013 | Denker et al. |
| 8,372,078 B2 | 2/2013 | Collazo |
| 8,386,018 B2 | 2/2013 | Stauch et al. |
| 8,388,553 B2 | 3/2013 | James et al. |
| 8,394,124 B2 | 3/2013 | Biyani |
| 8,403,958 B2 | 3/2013 | Schwab |
| 8,414,584 B2 | 4/2013 | Brigido |
| 8,419,734 B2 | 4/2013 | Walker et al. |
| 8,425,608 B2 | 4/2013 | Dewey et al. |
| 8,435,268 B2 | 5/2013 | Thompson et al. |
| 8,439,926 B2 | 5/2013 | Bojarski et al. |
| 8,444,693 B2 | 5/2013 | Reiley |
| 8,469,908 B2 | 6/2013 | Asfora |
| 8,470,004 B2 | 6/2013 | Reiley |
| 8,486,070 B2 | 7/2013 | Morgan et al. |

(56) References Cited

U.S. PATENT DOCUMENTS

| | | |
|---|---|---|
| 8,486,076 B2 | 7/2013 | Chavarria et al. |
| 8,486,147 B2 | 7/2013 | De Villiers et al. |
| 8,494,805 B2 | 7/2013 | Roche et al. |
| 8,496,662 B2 | 7/2013 | Novak et al. |
| 8,518,062 B2 | 8/2013 | Cole et al. |
| 8,523,866 B2 | 9/2013 | Sidebotham et al. |
| 8,529,474 B2 | 9/2013 | Gupta et al. |
| 8,529,606 B2 | 9/2013 | Alamin et al. |
| 8,529,607 B2 | 9/2013 | Alamin et al. |
| 8,551,092 B2 | 10/2013 | Morgan et al. |
| 8,556,901 B2 | 10/2013 | Anthony et al. |
| 8,556,911 B2 | 10/2013 | Mehta et al. |
| 8,556,975 B2 | 10/2013 | Ciupik et al. |
| 8,562,653 B2 | 10/2013 | Alamin et al. |
| 8,568,457 B2 | 10/2013 | Hunziker |
| 8,570,187 B2 | 10/2013 | Janna et al. |
| 8,579,979 B2 | 11/2013 | Edie et al. |
| 8,585,595 B2 | 11/2013 | Heilman |
| 8,585,740 B1 | 11/2013 | Ross et al. |
| 8,591,549 B2 | 11/2013 | Lange |
| 8,591,553 B2 | 11/2013 | Eisermann et al. |
| 8,613,758 B2 | 12/2013 | Linares |
| 8,617,220 B2 | 12/2013 | Skaggs |
| 8,622,936 B2 | 1/2014 | Schenberger et al. |
| 8,623,036 B2 | 1/2014 | Harrison et al. |
| 8,632,544 B2 | 1/2014 | Haaja et al. |
| 8,632,548 B2 | 1/2014 | Soubeiran |
| 8,632,563 B2 | 1/2014 | Nagase et al. |
| 8,636,771 B2 | 1/2014 | Butler et al. |
| 8,636,802 B2 | 1/2014 | Serhan et al. |
| 8,641,719 B2 | 2/2014 | Gephart et al. |
| 8,641,723 B2 | 2/2014 | Connor |
| 8,657,856 B2 | 2/2014 | Gephart et al. |
| 8,663,285 B2 | 3/2014 | Dall et al. |
| 8,663,287 B2 | 3/2014 | Butler et al. |
| 8,668,719 B2 | 3/2014 | Alamin et al. |
| 8,685,093 B2 | 4/2014 | Anderson et al. |
| 8,690,888 B2 | 4/2014 | Stein et al. |
| 8,709,090 B2 | 4/2014 | Makower et al. |
| 8,721,570 B2 | 5/2014 | Gupta et al. |
| 8,758,347 B2 | 6/2014 | Weiner et al. |
| 8,758,355 B2 | 6/2014 | Fisher et al. |
| 8,771,272 B2 | 7/2014 | LeCronier et al. |
| 8,777,877 B2 | 7/2014 | Stein et al. |
| 8,777,947 B2 | 7/2014 | Zahrly et al. |
| 8,777,995 B2 | 7/2014 | McClintock et al. |
| 8,784,339 B2 | 7/2014 | Stein et al. |
| 8,790,343 B2 | 7/2014 | McClellan et al. |
| 8,790,409 B2 | 7/2014 | Van den Heuvel et al. |
| 8,828,058 B2 | 9/2014 | Elsebaie et al. |
| 8,828,087 B2 | 9/2014 | Stone et al. |
| 8,840,651 B2 | 9/2014 | Reiley |
| 8,852,236 B2 | 10/2014 | Kiester |
| 8,870,881 B2 | 10/2014 | Rezach et al. |
| 8,870,959 B2 | 10/2014 | Arnin |
| 8,896,324 B2 | 11/2014 | Kroh et al. |
| 8,906,091 B2 | 12/2014 | Duda et al. |
| 8,911,448 B2 | 12/2014 | Stein |
| 8,915,915 B2 | 12/2014 | Harrison et al. |
| 8,915,917 B2 | 12/2014 | Doherty et al. |
| 8,920,422 B2 | 12/2014 | Homeier et al. |
| 8,926,674 B2 | 1/2015 | Wolter et al. |
| 8,945,133 B2 | 2/2015 | Stein et al. |
| 8,945,188 B2 | 2/2015 | Rezach et al. |
| 8,961,521 B2 | 2/2015 | Keefer et al. |
| 8,961,567 B2 | 2/2015 | Hunziker |
| 8,968,402 B2 | 3/2015 | Myers et al. |
| 8,992,527 B2 | 3/2015 | Guichet |
| 9,022,917 B2 | 5/2015 | Kasic et al. |
| 9,044,218 B2 | 6/2015 | Young |
| 9,060,743 B2 | 6/2015 | Munro et al. |
| 9,060,810 B2 | 6/2015 | Kercher et al. |
| 9,078,703 B2 | 7/2015 | Arnin |
| 9,107,580 B2 | 8/2015 | Goguin et al. |
| 9,278,214 B2 | 3/2016 | Young |
| 9,320,617 B2 | 4/2016 | Abdou et al. |
| 9,445,720 B2 | 9/2016 | Janna et al. |
| 9,510,785 B2 | 12/2016 | Munro et al. |
| RE46,582 E | 10/2017 | Morgan et al. |
| 9,795,423 B2 | 10/2017 | Deirmengian et al. |
| 9,820,869 B2 | 11/2017 | Aryan |
| 9,839,374 B2 | 12/2017 | Roche et al. |
| 10,117,580 B1 | 11/2018 | Puryear et al. |
| 10,123,881 B2 | 11/2018 | Moskowitz et al. |
| 10,271,832 B2 | 4/2019 | O'Neil et al. |
| 10,292,831 B2 | 5/2019 | Zellmer et al. |
| 10,441,210 B2 | 10/2019 | Deirmengian et al. |
| 10,524,718 B2 | 1/2020 | Young |
| 10,595,771 B2 | 3/2020 | Deirmengian et al. |
| 10,617,880 B2 | 4/2020 | Zellmer et al. |
| 10,639,167 B2 | 5/2020 | Benson et al. |
| 10,675,069 B2 | 6/2020 | Deirmengian et al. |
| 10,702,189 B2 | 7/2020 | Droit et al. |
| 10,765,527 B2 | 9/2020 | Chin et al. |
| 10,940,025 B2 | 3/2021 | O'Neil et al. |
| 10,952,867 B2 | 3/2021 | Moskowitz et al. |
| 11,058,549 B2 | 7/2021 | Zellmer et al. |
| 11,123,197 B2 | 9/2021 | Gross |
| 11,298,162 B2 | 4/2022 | Benson et al. |
| 11,304,819 B2 | 4/2022 | Chevalier |
| 2002/0049394 A1 | 4/2002 | Roy et al. |
| 2002/0050112 A1 | 5/2002 | Koch et al. |
| 2002/0072758 A1 | 6/2002 | Reo et al. |
| 2002/0164905 A1 | 11/2002 | Bryant |
| 2003/0040671 A1 | 2/2003 | Somogyi et al. |
| 2003/0083746 A1 | 5/2003 | Kuslich |
| 2003/0144669 A1 | 7/2003 | Robinson |
| 2003/0220643 A1 | 11/2003 | Ferree |
| 2003/0220644 A1 | 11/2003 | Thelen et al. |
| 2004/0011137 A1 | 1/2004 | Hnat et al. |
| 2004/0011365 A1 | 1/2004 | Govari et al. |
| 2004/0019353 A1 | 1/2004 | Freid et al. |
| 2004/0023623 A1 | 2/2004 | Stauch et al. |
| 2004/0055610 A1 | 3/2004 | Forsell |
| 2004/0073221 A1 | 4/2004 | Biscup |
| 2004/0133219 A1 | 7/2004 | Forsell |
| 2004/0138725 A1 | 7/2004 | Forsell |
| 2004/0193266 A1 | 9/2004 | Meyer |
| 2004/0243130 A1 | 12/2004 | Biscup |
| 2005/0034705 A1 | 2/2005 | McClendon |
| 2005/0049617 A1 | 3/2005 | Chatlynne et al. |
| 2005/0065529 A1 | 3/2005 | Liu et al. |
| 2005/0090823 A1 | 4/2005 | Bartimus |
| 2005/0159754 A1 | 7/2005 | Odrich |
| 2005/0234448 A1 | 10/2005 | McCarthy |
| 2005/0234462 A1 | 10/2005 | Hershberger |
| 2005/0246034 A1 | 11/2005 | Soubeiran |
| 2005/0261779 A1 | 11/2005 | Meyer |
| 2005/0272976 A1 | 12/2005 | Tanaka et al. |
| 2006/0004459 A1 | 1/2006 | Hazebrouck et al. |
| 2006/0009767 A1 | 1/2006 | Kiester |
| 2006/0036259 A1* | 2/2006 | Carl ............... A61B 17/7064 606/90 |
| 2006/0036323 A1 | 2/2006 | Carl et al. |
| 2006/0036324 A1 | 2/2006 | Sachs et al. |
| 2006/0047282 A1 | 3/2006 | Gordon |
| 2006/0058792 A1 | 3/2006 | Hynes |
| 2006/0069447 A1 | 3/2006 | DiSilvestro et al. |
| 2006/0074448 A1 | 4/2006 | Harrison et al. |
| 2006/0079897 A1 | 4/2006 | Harrison et al. |
| 2006/0136062 A1 | 6/2006 | DiNello et al. |
| 2006/0142767 A1 | 6/2006 | Green et al. |
| 2006/0155279 A1 | 7/2006 | Ogilvie |
| 2006/0195087 A1 | 8/2006 | Sacher et al. |
| 2006/0195088 A1 | 8/2006 | Sacher et al. |
| 2006/0200134 A1 | 9/2006 | Freid et al. |
| 2006/0204156 A1 | 9/2006 | Takehara et al. |
| 2006/0235299 A1 | 10/2006 | Martinelli |
| 2006/0235424 A1 | 10/2006 | Vitale et al. |
| 2006/0241746 A1 | 10/2006 | Shaoulian et al. |
| 2006/0241767 A1 | 10/2006 | Doty |
| 2006/0247773 A1 | 11/2006 | Stamp |
| 2006/0249914 A1 | 11/2006 | Dulin |
| 2006/0271107 A1 | 11/2006 | Harrison et al. |

(56) References Cited

U.S. PATENT DOCUMENTS

| | | |
|---|---|---|
| 2006/0282073 A1 | 12/2006 | Simanovsky |
| 2006/0293683 A1 | 12/2006 | Stauch |
| 2007/0010814 A1* | 1/2007 | Stauch ............... A61B 17/7216 606/62 |
| 2007/0010887 A1 | 1/2007 | Williams et al. |
| 2007/0021644 A1 | 1/2007 | Woolson et al. |
| 2007/0031131 A1 | 2/2007 | Griffitts |
| 2007/0043376 A1 | 2/2007 | Leatherbury et al. |
| 2007/0050030 A1 | 3/2007 | Kim |
| 2007/0118215 A1 | 5/2007 | Moaddeb |
| 2007/0161984 A1 | 7/2007 | Cresina et al. |
| 2007/0173837 A1 | 7/2007 | Chan et al. |
| 2007/0179493 A1 | 8/2007 | Kim |
| 2007/0185374 A1 | 8/2007 | Kick et al. |
| 2007/0233098 A1 | 10/2007 | Mastrorio et al. |
| 2007/0239159 A1 | 10/2007 | Altarac et al. |
| 2007/0239161 A1 | 10/2007 | Giger et al. |
| 2007/0255088 A1 | 11/2007 | Jacobson et al. |
| 2007/0270803 A1 | 11/2007 | Giger et al. |
| 2007/0276368 A1 | 11/2007 | Trieu et al. |
| 2007/0276369 A1 | 11/2007 | Allard et al. |
| 2007/0276373 A1 | 11/2007 | Malandain |
| 2007/0276378 A1 | 11/2007 | Harrison et al. |
| 2007/0276493 A1* | 11/2007 | Malandain ......... A61B 17/7065 606/66 |
| 2007/0288024 A1 | 12/2007 | Gollogly |
| 2007/0288183 A1 | 12/2007 | Bulkes et al. |
| 2008/0009792 A1 | 1/2008 | Henniges et al. |
| 2008/0015577 A1 | 1/2008 | Loeb |
| 2008/0021454 A1 | 1/2008 | Chao et al. |
| 2008/0021455 A1 | 1/2008 | Chao et al. |
| 2008/0021456 A1 | 1/2008 | Gupta et al. |
| 2008/0027436 A1 | 1/2008 | Cournoyer et al. |
| 2008/0033431 A1 | 2/2008 | Jung et al. |
| 2008/0033436 A1 | 2/2008 | Song et al. |
| 2008/0051784 A1 | 2/2008 | Gollogly |
| 2008/0082118 A1 | 4/2008 | Edidin et al. |
| 2008/0086128 A1 | 4/2008 | Lewis |
| 2008/0097487 A1 | 4/2008 | Pool et al. |
| 2008/0097496 A1 | 4/2008 | Chang et al. |
| 2008/0108995 A1 | 5/2008 | Conway et al. |
| 2008/0133016 A1 | 6/2008 | Heinz |
| 2008/0154265 A1 | 6/2008 | Duda et al. |
| 2008/0161933 A1 | 7/2008 | Grotz et al. |
| 2008/0167685 A1 | 7/2008 | Allard et al. |
| 2008/0172063 A1 | 7/2008 | Taylor |
| 2008/0177319 A1 | 7/2008 | Schwab |
| 2008/0177326 A1 | 7/2008 | Thompson |
| 2008/0190237 A1 | 8/2008 | Radinger et al. |
| 2008/0208516 A1 | 8/2008 | James |
| 2008/0228186 A1 | 9/2008 | Gall et al. |
| 2008/0255615 A1 | 10/2008 | Vittur et al. |
| 2008/0272928 A1 | 11/2008 | Shuster |
| 2008/0275557 A1 | 11/2008 | Makower et al. |
| 2009/0030462 A1 | 1/2009 | Buttermann |
| 2009/0076597 A1 | 3/2009 | Dahlgren et al. |
| 2009/0082815 A1 | 3/2009 | Zylber et al. |
| 2009/0088803 A1 | 4/2009 | Justis et al. |
| 2009/0093820 A1 | 4/2009 | Trieu et al. |
| 2009/0093890 A1 | 4/2009 | Gelbart |
| 2009/0098092 A1 | 4/2009 | Meredith |
| 2009/0112207 A1 | 4/2009 | Walker et al. |
| 2009/0112263 A1 | 4/2009 | Pool et al. |
| 2009/0163780 A1 | 6/2009 | Tieu |
| 2009/0171356 A1 | 7/2009 | Klett |
| 2009/0192514 A1 | 7/2009 | Feinberg et al. |
| 2009/0198144 A1 | 8/2009 | Phillips et al. |
| 2009/0216113 A1 | 8/2009 | Meier et al. |
| 2009/0275984 A1 | 11/2009 | Kim et al. |
| 2010/0004654 A1 | 1/2010 | Schmitz et al. |
| 2010/0057127 A1 | 3/2010 | McGuire et al. |
| 2010/0094306 A1 | 4/2010 | Chang et al. |
| 2010/0100185 A1 | 4/2010 | Trieu et al. |
| 2010/0106192 A1 | 4/2010 | Barry |
| 2010/0114322 A1 | 5/2010 | Clifford et al. |
| 2010/0130941 A1 | 5/2010 | Conlon et al. |
| 2010/0137872 A1 | 6/2010 | Kam et al. |
| 2010/0145449 A1 | 6/2010 | Makower et al. |
| 2010/0145462 A1 | 6/2010 | Ainsworth et al. |
| 2010/0168751 A1 | 7/2010 | Anderson et al. |
| 2010/0249533 A1 | 9/2010 | Pierce et al. |
| 2010/0249782 A1 | 9/2010 | Durham |
| 2010/0256626 A1 | 10/2010 | Muller et al. |
| 2010/0262239 A1 | 10/2010 | Boyden et al. |
| 2010/0268119 A1 | 10/2010 | Morrison |
| 2010/0318129 A1 | 12/2010 | Seme et al. |
| 2010/0331883 A1 | 12/2010 | Schmitz et al. |
| 2011/0004076 A1 | 1/2011 | Janna et al. |
| 2011/0057756 A1 | 3/2011 | Marinescu et al. |
| 2011/0066188 A1 | 3/2011 | Seme et al. |
| 2011/0098748 A1 | 4/2011 | Jangra |
| 2011/0152725 A1* | 6/2011 | Demir ................... A61B 5/103 600/587 |
| 2011/0196435 A1 | 8/2011 | Forsell |
| 2011/0202138 A1 | 8/2011 | Shenoy et al. |
| 2011/0238126 A1 | 9/2011 | Soubeiran |
| 2011/0257655 A1 | 10/2011 | Copf, Jr. |
| 2011/0284014 A1 | 11/2011 | Cadeddu et al. |
| 2011/0295159 A1 | 12/2011 | Shachar et al. |
| 2012/0019341 A1 | 1/2012 | Gabay et al. |
| 2012/0019342 A1 | 1/2012 | Gabay et al. |
| 2012/0053633 A1 | 3/2012 | Stauch |
| 2012/0065497 A1 | 3/2012 | Brown et al. |
| 2012/0088953 A1 | 4/2012 | King |
| 2012/0109207 A1 | 5/2012 | Trieu |
| 2012/0116535 A1 | 5/2012 | Ratron et al. |
| 2012/0158061 A1 | 6/2012 | Koch et al. |
| 2012/0172883 A1 | 7/2012 | Sayago |
| 2012/0179215 A1 | 7/2012 | Soubeiran |
| 2012/0221106 A1 | 8/2012 | Makower et al. |
| 2012/0253345 A1 | 10/2012 | Wixted |
| 2012/0271353 A1 | 10/2012 | Barry |
| 2012/0289865 A1 | 11/2012 | Lambrecht et al. |
| 2012/0296234 A1 | 11/2012 | Wilhelm et al. |
| 2012/0329882 A1 | 12/2012 | Messersmith et al. |
| 2013/0013066 A1 | 1/2013 | Landry et al. |
| 2013/0072932 A1 | 3/2013 | Stauch |
| 2013/0079678 A1 | 3/2013 | Stein et al. |
| 2013/0123847 A1 | 5/2013 | Anderson et al. |
| 2013/0138017 A1 | 5/2013 | Jundt et al. |
| 2013/0138154 A1 | 5/2013 | Reiley |
| 2013/0150863 A1 | 6/2013 | Baumgartner |
| 2013/0150889 A1 | 6/2013 | Fening et al. |
| 2013/0150970 A1 | 6/2013 | Thaiyananthan |
| 2013/0178903 A1 | 7/2013 | Abdou |
| 2013/0211521 A1 | 8/2013 | Shenoy et al. |
| 2013/0245692 A1 | 9/2013 | Hayes et al. |
| 2013/0253344 A1 | 9/2013 | Griswold et al. |
| 2013/0253587 A1 | 9/2013 | Carls et al. |
| 2013/0261672 A1 | 10/2013 | Horvath |
| 2013/0296863 A1 | 11/2013 | Globerman et al. |
| 2013/0296864 A1 | 11/2013 | Burley et al. |
| 2013/0296940 A1 | 11/2013 | Northcutt et al. |
| 2013/0325006 A1 | 12/2013 | Michelinie et al. |
| 2013/0325071 A1 | 12/2013 | Niemiec et al. |
| 2014/0005788 A1 | 1/2014 | Haaja et al. |
| 2014/0025172 A1 | 1/2014 | Lucas et al. |
| 2014/0052134 A1 | 2/2014 | Orisek |
| 2014/0058392 A1 | 2/2014 | Mueckter et al. |
| 2014/0058450 A1 | 2/2014 | Arlet |
| 2014/0066987 A1 | 3/2014 | Hestad et al. |
| 2014/0088715 A1 | 3/2014 | Ciupik |
| 2014/0128920 A1 | 5/2014 | Kantelhardt |
| 2014/0163664 A1 | 6/2014 | Goldsmith |
| 2014/0236234 A1 | 8/2014 | Kroll et al. |
| 2014/0236311 A1 | 8/2014 | Vicatos et al. |
| 2014/0257412 A1 | 9/2014 | Patty et al. |
| 2014/0277446 A1 | 9/2014 | Clifford et al. |
| 2014/0296918 A1 | 10/2014 | Fening et al. |
| 2014/0303538 A1 | 10/2014 | Baym et al. |
| 2014/0303539 A1 | 10/2014 | Baym et al. |
| 2014/0358150 A1 | 12/2014 | Kaufman et al. |
| 2015/0105782 A1 | 4/2015 | D'Lima et al. |
| 2015/0105824 A1 | 4/2015 | Moskowitz et al. |

(56) References Cited

U.S. PATENT DOCUMENTS

| | | | |
|---|---|---|---|
| 2016/0270927 A1 | 9/2016 | Zellmer et al. | |
| 2017/0079555 A1 | 3/2017 | Munro et al. | |
| 2017/0172624 A1* | 6/2017 | Brunner | A61B 17/8858 |
| 2017/0196508 A1 | 7/2017 | Hunter | |
| 2017/0231559 A1 | 8/2017 | Cuevas et al. | |
| 2018/0055444 A1 | 3/2018 | Windolf | |
| 2018/0153709 A1 | 6/2018 | Hunter | |
| 2018/0192939 A1 | 7/2018 | Roth et al. | |
| 2018/0318579 A1 | 11/2018 | Puryear et al. | |
| 2019/0008386 A1 | 1/2019 | Puryear et al. | |
| 2019/0009083 A1 | 1/2019 | Webster et al. | |
| 2019/0156482 A1 | 5/2019 | Deitz et al. | |
| 2019/0224022 A1 | 7/2019 | Zellmer et al. | |
| 2019/0365541 A1 | 12/2019 | Friis et al. | |
| 2020/0022733 A1 | 1/2020 | Benson et al. | |
| 2020/0022772 A1 | 1/2020 | Benson et al. | |
| 2020/0069247 A1 | 3/2020 | Hunter | |
| 2020/0107940 A1 | 4/2020 | Murphy et al. | |
| 2020/0108252 A1 | 4/2020 | Zellmer et al. | |
| 2020/0187849 A1 | 6/2020 | Deirmengian et al. | |
| 2020/0253588 A1 | 8/2020 | Bae et al. | |
| 2020/0253651 A1 | 8/2020 | Deirmengian et al. | |
| 2020/0297513 A1 | 9/2020 | Zellmer et al. | |
| 2020/0352723 A1 | 11/2020 | Jimenez et al. | |
| 2021/0052394 A1 | 2/2021 | Chin et al. | |
| 2021/0101002 A1 | 4/2021 | Saigal et al. | |
| 2021/0128919 A1 | 5/2021 | Zellmer et al. | |
| 2021/0161682 A1 | 6/2021 | O'Neil et al. | |
| 2021/0205625 A1 | 7/2021 | Friis et al. | |
| 2021/0243899 A1 | 8/2021 | Harris et al. | |
| 2021/0259748 A1* | 8/2021 | Mullaney | A61B 17/72 |
| 2021/0307786 A1 | 10/2021 | Ross et al. | |
| 2021/0315708 A1 | 10/2021 | Moskowitz et al. | |
| 2022/0071670 A1 | 3/2022 | Cheng et al. | |

FOREIGN PATENT DOCUMENTS

| | | | |
|---|---|---|---|
| DE | 1541262 A1 | 6/1969 | |
| DE | 8515687 U1 | 12/1985 | |
| DE | 19626230 A1 | 1/1998 | |
| DE | 19745654 A1 | 4/1999 | |
| DE | 102005045070 A1 | 4/2007 | |
| EP | 0663184 A1 | 7/1995 | |
| EP | 1905388 A1 | 4/2008 | |
| FR | 2901991 A1 | 12/2007 | |
| FR | 2900563 B1 | 8/2008 | |
| FR | 2892617 B1 | 9/2008 | |
| FR | 2916622 B1 | 9/2009 | |
| FR | 2961386 B1 | 12/2011 | |
| JP | H0956736 | 3/1997 | |
| JP | 2002500063 A | 1/2002 | |
| WO | WO1998044858 A1 | 10/1998 | |
| WO | WO1999051160 A1 | 10/1999 | |
| WO | WO2001024697 A1 | 4/2001 | |
| WO | WO2001045485 A3 | 6/2001 | |
| WO | WO2001045487 A2 | 6/2001 | |
| WO | WO2001067973 A2 | 9/2001 | |
| WO | WO2001078614 A1 | 10/2001 | |
| WO | WO2007013059 A3 | 2/2007 | |
| WO | WO2007015239 A3 | 2/2007 | |
| WO | WO2011116158 A3 | 9/2011 | |
| WO | WO2013119528 A1 | 8/2013 | |
| WO | WO2014040013 A1 | 3/2014 | |
| WO | 2022/182582 A1 | 9/2022 | |
| WO | WO-2022204096 A1 * | 9/2022 | A61B 17/7216 |
| WO | 2022/249101 A2 | 12/2022 | |

OTHER PUBLICATIONS

Ahlbom et al., "Guidelines for limiting exposure to time-varying electric, magnetic, and electromagnetic fields (up to 300 GHz). International Commission on Non-Ionizing Radiation Protection.", Health Physics, 1998, pp. 494-522, 74, No. 4.

Amer et al., "Evaluation of treatment of late-onset tibia vara using gradual angulation translation high tibial osteotomy", ACTA Orthopaedica Belgica, 2010, pp. 360-366, 76, No. 3.

Angrisani et al., "Lap-Band® Rapid Port™ System: Preliminary results in 21 patients", Obesity Surgery, 2005, p. 936, 15, No. 7.

Baumgart et al., "A fully implantable, programmable distraction nail (Fitbone)—new perspectives for corrective and reconstructive limb surgery.", Practice of Intramedullary Locked Nails, 2006, pp. 189-198.

Baumgart et al., "The bioexpandable prosthesis: A new perspective after resection of malignant bone tumors in children.", J Pediatr Hematol Oncol, 2005, pp. 452-455, 27, No. 8.

Bodó et al., "Development of a tension-adjustable implant for anterior cruciate ligament reconstruction.", Eklem Hastaliklari ve Cerrahisi—Joint Diseases and Related Surgery, 2008, pp. 27-32, 19, No. 1.

Boudjemline et al., "Off-label use of an adjustable gastric banding system for pulmonary artery banding.", The Journal of Thoracic and Cardiovascular Surgery, 2006, pp. 1130-1135, 131, No. 5.

Brown et al., "Single port surgery and the Dundee Endocone.", SAGES Annual Scientific Sessions: Emerging Technology Poster Abstracts, 2007, ETP007, pp. 323-324.

Buchowski et al., "Temporary internal distraction as an aid to correction of severe scoliosis", J Bone Joint Surg Am, 2006, pp. 2035-2041, 88-A, No. 9.

Burghardt et al., "Mechanical failure of the Intramedullary Skeletal Kinetic Distractor in limb lengthening.", J Bone Joint Surg Br, 2011, pp. 639-643, 93-B, No. 5.

Burke, "Design of a minimally invasive non fusion device for the surgical management of scoliosis in the skeletally immature", Studies in Health Technology and Informatics, 2006, pp. 378-384, 123.

Carter et al., "A cumulative damage model for bone fracture.", Journal of Orthopaedic Research, 1985, pp. 84-90, 3, No. 1.

Chapman et al., "Laparoscopic adjustable gastric banding in the treatment of obesity: A systematic literature review.", Surgery, 2004, pp. 326-351, 135, No. 3.

Cole et al., "Operative technique intramedullary skeletal kinetic distractor: Tibial surgical technique.", Orthofix, 2005.

Cole et al., "The intramedullary skeletal kinetic distractor (ISKD): first clinical results of a new intramedullary nail for lengthening of the femur and tibia.", Injury, 2001, pp. S-D-129-S-D-139, 32.

Dailey et al., "A novel intramedullary nail for micromotion stimulation of tibial fractures.", Clinical Biomechanics, 2012, pp. 182-188, 27, No. 2.

Daniels et al., "A new method for continuous intraoperative measurement of Harrington rod loading patterns.", Annals of Biomedical Engineering, 1984, pp. 233-246, 12, No. 3.

De Giorgi et al., "Cotrel-Dubousset instrumentation for the treatment of severe scoliosis.", European Spine Journal, 1999, pp. 8-15, No. 1.

Dorsey et al., "The stability of three commercially available implants used in medial opening wedge high tibial osteotomy.", Journal of Knee Surgery, 2006, pp. 95-98, 19, No. 2.

Edeland et al., "Instrumentation for distraction by limited surgery in scoliosis treatment.", Journal of Biomedical Engineering, 1981, pp. 143-146, 3, No. 2.

Elsebaie, "Single growing rods (Review of 21 cases). Changing the foundations: Does it affect the results?", Journal of Child Orthop, 2007, 1:258.

Ember et al., "Distraction forces required during growth rod lengthening.", J of Bone Joint Surg BR, 2006, p. 229, 88-B, No. Suppl. II.

European Patent Office, "Observations by a third party under Article 115 EPC in EP08805612 by Soubeiran.", 2010.

Fabry et al., "A technique for prevention of port complications after laparoscopic adjustable silicone gastric banding.", Obesity Surgery, 2002, pp. 285-288, 12, No. 2.

Fried et al., "In vivo measurements of different gastric band pressures towards the gastric wall at the stoma region.", Obesity Surgery, 2004, p. 914, 14, No. 7.

Gao et al., CHD7 gene polymorphisms are associated with susceptibility to idiopathic scoliosis, American Journal of Human Genetics, 2007, pp. 957-965, 80.

(56) References Cited

OTHER PUBLICATIONS

Gebhart et al., "Early clinical experience with a custom made growing endoprosthesis in children with malignant bone tumors of the lower extremity actioned by an external permanent magnet; The Phenix M. system", International Society of Limb Salvage 14th International Symposium on Limb Salvage. Sep. 3, 2007, Hamburg, Germany. (2 pages).
Gillespie et al. "Harrington instrumentation without fusion.", J Bone Joint Surg Br, 1981, p. 461, 63-B, No. 3.
Goodship et al., "Strain rate and timing of stimulation in mechanical modulation of fracture healing.", Clinical Orthopaedics and Related Research, 1998, pp. S105-S115, No. 355S.
Grass et al., "Intermittent distracting rod for correction of high neurologic risk congenital scoliosis.", Spine, 1997, pp. 1922-1927, 22, No. 16.
Gray, "Gray's anatomy of the human body.", http://education.yahoo.com/reference/gray/subjects/subject/128, published Jul. 1, 2007.
Grimer et al. "Non-invasive extendable endoprostheses for children—Expensive but worth it!", International Society of Limb Salvage 14th International Symposium on Limb Salvage, 2007.
Grünert, "The development of a totally implantable electronic sphincter." (translated from the German "Die Entwicklung eines total implantierbaren elektronischen Sphincters"), Langenbecks Archiv fur Chirurgie, 1969, pp. 1170-1174, 325.
Guichet et al. "Gradual femoral lengthening with the Albizzia intramedullary nail", J Bone Joint Surg Am, 2003, pp. 838-848, 85-A, No. 5.
Gupta et al., "Non-invasive distal femoral expandable endoprosthesis for limb-salvage surgery in paediatric tumours.", J Bone Joint Surg Br, 2006, pp. 649-654, 88-B, No. 5.
Hankemeier et al., "Limb lengthening with the Intramedullary Skeletal Kinetic Distractor (ISKD).", Oper Orthop Traumatol, 2005, pp. 79-101, 17, No. 1.
Harrington, "Treatment of scoliosis. Correction and internal fixation by spine instrumentation.", J Bone Joint Surg Am, 1962, pp. 591-610, 44-A, No. 4.
Hennig et al., "The safety and efficacy of a new adjustable plate used for proximal tibial opening wedge osteotomy in the treatment of unicompartmental knee osteoarthrosis.", Journal of Knee Surgery, 2007, pp. 6-14, 20, No. 1.
Hofmeister et al., "Callus distraction with the Albizzia nail.", Practice of Intramedullary Locked Nails, 2006, pp. 211-215.
Horbach et al., "First experiences with the routine use of the Rapid Port™ system with the Lap-Band®.", Obesity Surgery, 2006, p. 418, 16, No. 4.
Hyodo et al., "Bone transport using intramedullary fixation and a single flexible traction cable.", Clinical Orthopaedics and Related Research, 1996, pp. 256-268, 325.
International Commission on Non-Ionizing Radiation Protection, "Guidelines on limits of exposure to static magnetic fields." Health Physics, 2009, pp. 504-514, 96, No. 4.
INVIS®/Lamello Catalog, 2006, Article No. 68906A001 GB.
Kasliwal et al., "Management of high-grade spondylolisthesis.", Neurosurgery Clinics of North America, 2013, pp. 275-291, 24, No. 2.
Kenawey et al., "Leg lengthening using intramedullay skeletal kinetic distractor: Results of 57 consecutive applications.", Injury, 2011, pp. 150-155, 42, No. 2.
Kent et al., "Assessment and correction of femoral malrotation following intramedullary nailing of the femur.", Acta Orthop Belg, 2010, pp. 580-584, 76, No. 5.
Klemme et al., "Spinal instrumentation without fusion for progressive scoliosis in young children", Journal of Pediatric Orthopaedics. 1997, pp. 734-742, 17, No. 6.
Korenkov et al., "Port function after laparoscopic adjustable gastric banding for morbid obesity.", Surgical Endoscopy, 2003, pp. 1068-1071, 17, No. 7.
Krieg et al., "Leg lengthening with a motorized nail in adolescents.", Clinical Orthopaedics and Related Research, 2008, pp. 189-197, 466, No. 1.

Kucukkaya et al., "The new intramedullary cable bone transport technique.", Journal of Orthopaedic Trauma, 2009, pp. 531-536, 23, No. 7.
Lechner et al., "In vivo band manometry: A new method in band adjustment", Obesity Surgery, 2005, p. 935, 15, No. 7.
Lechner et al., "Intra-band manometry for band adjustments: The basics", Obesity Surgery, 2006, pp. 417-418, 16, No. 4.
Li et al., "Bone transport over an intramedullary nail: A case report with histologic examination of the regenerated segment.", Injury, 1999, pp. 525-534, 30, No. 8.
Lonner, "Emerging minimally invasive technologies for the management of scoliosis.", Orthopedic Clinics of North America, 2007, pp. 431-440, 38, No. 3.
Matthews et al., "Magnetically adjustable intraocular lens.", Journal of Cataract and Refractive Surgery, 2003, pp. 2211-2216, 29, No. 11.
Micromotion, "Micro Drive Engineering•General catalogue.", 2009, pp. 14-24.
Mineiro et al., "Subcutaneous rodding for progressive spinal curvatures: Early results.", Journal of Pediatric Orthopaedics, 2002, pp. 290-295, 22, No. 3.
Moe et al., "Harrington instrumentation without fusion plus external orthotic support for the treatment of difficult curvature problems in young children.", Clinical Orthopaedics and Related Research, 1984, pp. 35-45, 185.
Montague et al., "Magnetic gear dynamics for servo control.", Melecon 2010—2010 15th IEEE Mediterranean Electrotechnical Conference, Valletta, 2010, pp. 1192-1197.
Montague et al., "Servo control of magnetic gears.", IEEE/ASME Transactions on Mechatronics, 2012, pp. 269-278, 17, No. 2.
Nachemson et al., "Intravital wireless telemetry of axial forces in Harrington distraction rods in patients with idiopathic scoliosis.", The Journal of Bone and Joint Surgery, 1971, pp. 445-465, 53, No. 3.
Nachlas et al., "The cure of experimental scoliosis by directed growth control.", The Journal of Bone and Joint Surgery, 1951, pp. 24-34, 33-A, No. 1.
Newton et al., "Fusionless scoliosis correction by anterolateral tethering . . . can it work?. ", 39th Annual Scoliosis Research Society Meeting, 2004.
Oh et al., "Bone transport over an intramedullary nail for reconstruction of long bone defects in tibia.", Archives of Orthopaedic and Trauma Surgery, 2008, pp. 801-808, 128, No. 8.
Ozcivici et al., "Mechanical signals as anabolic agents in bone.", Nature Reviews Rheumatology, 2010, pp. 50-59, 6, No. 1.
Piorkowski et al., Preventing Port Site Inversion in Laparoscopic Adjustable Gastric Banding, Surgery for Obesity and Related Diseases, 2007, 3(2), pp. 159-162, Elsevier; New York, U.S.A.
Prontes, "Longest bone in body.", eHow.com, 2012.
Rathjen et al., "Clinical and radiographic results after implant removal in idiopathic scoliosis.", Spine, 2007, pp. 2184-2188, 32, No. 20.
Ren et al., "Laparoscopic adjustable gastric banding: Surgical technique", Journal of Laparoendoscopic & Advanced Surgical Techniques, 2003, pp. 257-263, 13, No. 4.
Reyes-Sanchez et al., "External fixation for dynamic correction of severe scoliosis", The Spine Journal, 2005, pp. 418-426, 5, No. 4.
Rinsky et al., "Segmental instrumentation without fusion in children with progressive scoliosis.", Journal of Pediatric Orthopedics, 1985, pp. 687-690, 5, No. 6.
Rode et al., "A simple way to adjust bands under radiologic control", Obesity Surgery, 2006, p. 418, 16, No. 4.
Schmerling et al., "Using the shape recovery of nitinol in the Harrington rod treatment of scoliosis.", Journal of Biomedical Materials Research, 1976, pp. 879-892, 10, No. 6.
Scott et al., "Transgastric, transcolonic and transvaginal cholecystectomy using magnetically anchored instruments.", SAGES Annual Scientific Sessions, Poster Abstracts, Apr. 18-22, 2007, P511, p. 306.
Sharke, "The machinery of life", Mechanical Engineering Magazine, Feb. 2004, Printed from Internet site Oct. 24, 2007 http://www.memagazine.org/contents/current/features/moflife/moflife.html.
Shiha et al., "Ilizarov gradual correction of genu varum deformity in adults.", Acta Orthop Belg, 2009, pp. 784-791, 75, No. 6.

(56) References Cited

OTHER PUBLICATIONS

Simpson et al., "Femoral lengthening with the intramedullary skeletal kinetic distractor.", Journal of Bone and Joint Surgery, 2009, pp. 955-961, 91-B, No. 7.
Smith, "The use of growth-sparing instrumentation in pediatric spinal deformity.", Orthopedic Clinics of North America, 2007, pp. 547-552, 38, No. 4.
Soubeiran et al. "The Phenix M System, a fully implanted non-invasive lengthening device externally controllable through the skin with a palm size permanent magnet. Applications in limb salvage." International Society of Limb Salvage 14th International Symposium on Limb Salvage, Sep. 13, 2007, Hamburg, Germany. (2 pages).
Soubeiran et al., "The Phenix M System. A fully implanted lengthening device externally controllable through the skin with a palm size permanent magnet; Applications to pediatric orthopaedics", 6th European Research Conference in Pediatric Orthopaedics, Oct. 6, 2006, Toulouse, France (7 pages).
Stokes et al., "Reducing radiation exposure in early-onset scoliosis surgery patients: Novel use of ultrasonography to measure lengthening in magnetically-controlled growing rods. Prospective validation study and assessment of clinical algorithm", 20th International Meeting on Advanced Spine Techniques, Jul. 11, 2013. Vancouver, Canada. Scoliosis Research Society.
Sun et al., "Masticatory mechanics of a mandibular distraction osteogenesis site: Interfragmentary micromovement.", Bone, 2007, pp. 188-196, 41, No. 2.
Synthes Spine, "VEPTR II. Vertical Expandable Prosthetic Titanium Rib II: Technique Guide.", 2008, 40 pgs.
Synthes Spine, "VEPTR Vertical Expandable Prosthetic Titanium Rib, Patient Guide.", 2005, 26 pgs.
Takaso et al., "New remote-controlled growing-rod spinal instrumentation possibly applicable for scoliosis in young children.", Journal of Orthopaedic Science, 1998, pp. 336-340, 3, No. 6.
Teli et al., "Measurement of forces generated during distraction of growing rods.", Journal of Children's Orthopaedics, 2007, pp. 257-258, 1, No. 4.
Tello, "Harrington instrumentation without arthrodesis and consecutive distraction program for young children with severe spinal deformities: Experience and technical details.", The Orthopedic Clinics of North America, 1994, pp. 333-351, 25, No. 2.
Thaller et al., "Limb lengthening with fully implantable magnetically actuated mechanical nails (Phenix®)—Preliminary results.", Injury, 2014 (E-published Oct. 28, 2013), pp. S60-S65, 45.
Thompson et al., "Early onset scoliosis: Future directions", 2007, J Bone Joint Surg Am, pp. 163-166, 89-A, Suppl 1.
Thompson et al., "Growing rod techniques in early-onset scoliosis", Journal of Pediatric Orthopedics, 2007, pp. 354-361, 27, No. 3.
Thonse et al., "Limb lengthening with a fully implantable, telescopic, intramedullary nail.", Operative Techniques in Orthopedics, 2005, pp. 355-362, 15, No. 4.
Trias et al., "Dynamic loads experienced in correction of idiopathic scoliosis using two types of Harrington rods.", Spine, 1979, pp. 228-235, 4, No. 3.
Verkerke et al., "An extendable modular endoprosthetic system for bone tumor management in the leg", Journal of Biomedical Engineering, 1990, pp. 91-96, 12, No. 2.
Verkerke et al., "Design of a lengthening element for a modular femur endoprosthetic system", Proceedings of the Institution of Mechanical Engineers Part H: Journal of Engineering in Medicine, 1989, pp. 97-102, 203, No. 2.
Verkerke et al., "Development and test of an extendable endoprosthesis for bone reconstruction in the leg.", The International Journal of Artificial Organs, 1994, pp. 155-162, 17, No. 3.
Weiner et al., "Initial clinical experience with telemetrically adjustable gastric banding", Surgical Technology International, 2005, pp. 63-69, 15.
Wenger, "Spine jack operation in the correction of scoliotic deformity: A direct intrathoracic attack to straighten the laterally bent spine: Preliminary report", Arch Surg, 1961, pp. 123-132 (901-910), 83, No. 6.
White, III et al., "The clinical biomechanics of scoliosis.", Clinical Orthopaedics and Related Research, 1976, pp. 100-112, 118.
Yonnet, "A new type of permanent magnet coupling.", IEEE Transactions on Magnetics, 1981, pp. 2991-2993, 17, No. 6.
Yonnet, "Passive magnetic bearings with permanent magnets.", IEEE Transactions on Magnetics, 1978, pp. 803-805, 14, No. 5.
Zheng et al., "Force and torque characteristics for magnetically driven blood pump.", Journal of Magnetism and Magnetic Materials, 2002, pp. 292-302, 241, No. 2.
Lauterburg et al., "Forces Involved in Lower Limb Lengthening: An In Vivo Biomechanical Study," Journal of Orthopaedic Research, pp. 1815-1822, Sep. 2006, 8 pages.
International Search Report and Written Opinion from PCT/US2023/026981, dated Oct. 10, 2023 (20 pages).

\* cited by examiner

INTERMEDULLARY LENGTHENING IMPLANT WITH INTEGRATED LOAD SENSOR

TECHNICAL FIELD

This disclosure generally relates to biocompatible implants. More particularly, the disclosure relates to implants for moving bone in a patient's body.

BACKGROUND

Implantable bone adjustment systems can beneficially treat a variety of conditions. For example, implantable bone adjustment systems can be used for purposes of distraction osteogenesis (also known as distraction callotasis and osteo-distraction) in applications such as: post osteosarcoma bone cancer; cosmetic lengthening (both legs-femur and/or tibia) in short stature or dwarfism/achondroplasia; lengthening of one limb to match the other (congenital, post-trauma, post-skeletal disorder, prosthetic knee joint), nonunions, etc. Additionally, implantable bone adjustment systems can be used in treatment of various additional conditions and ailments such as scoliosis or osteoarthritis (e.g., knee osteoarthritis). Additional examples of treatment applications for implantable bone adjustment systems are described in U.S. patent application Ser. No. 16/298,339 (filed Mar. 11, 2019) and U.S. patent application Ser. No. 13/370,966 (filed Feb. 14, 2011), which are incorporated herein by reference in their entirety.

SUMMARY

The needs above, as well as others, are addressed by embodiments of implants and related methods described in this disclosure. All examples and features mentioned below can be combined in any technically possible way.

Various implementations include implants for moving bone in a patient's body, related systems, and methods. Certain implementations include a biocompatible implant with an integrated load sensor.

In particular aspects, an implant for moving bone in a patient's body includes: an implantable biocompatible housing; a first adjustment rod at least partially overlapping the implantable biocompatible housing; a driver configured to drive the first adjustment rod to enable movement of the first adjustment rod relative to the housing; and a load sensor positioned within the housing and configured to indicate a load applied by the driver on the first adjustment rod.

In additional particular aspects, an implant for moving bone in a patient's body includes: an implantable biocompatible housing having a first cavity; a first adjustment rod at least partially contained within the first cavity; a driver configured to drive the first adjustment rod to enable movement relative to the housing, wherein the driver includes: a magnetic actuator configured to be actuated by a magnetic field external to the patient's body; and a driven gear system coupled with the magnetic actuator; and a load sensor positioned between the driven gear system of the driver and the first adjustment rod, the load sensor for indicating a load applied by the driver on the first adjustment rod.

In further particular aspects, a method includes: causing an implanted distraction device to expand using an external control device; measuring load sensor data with a load sensor of the implanted distraction device; and determining, using the load sensor data, an amount of movement of bone in the patient's body.

In additional particular aspects, a method of intermedullary adjustment of a patient's bone is performed using an implant described according to aspects of the disclosure.

Implementations may include one of the following features, or any combination thereof.

In particular aspects, the implant is configured to be wirelessly communicatively coupled to an external control device for transmitting data from the load sensor.

In certain cases, the implant includes a wireless transmitter and one or more processors configured to cause the wireless transmitter to transmit data from the load sensor.

In particular implementations, the implantable biocompatible housing comprises a first cavity defining an opening; wherein the first adjustment rod is at least partially disposed within the first cavity, wherein the load sensor is positioned between the driver and the opening.

In some aspects, the driver includes a magnetic actuator configured to be actuated by a magnetic field external to the patient's body.

In certain implementations, the implant has a proximal end and a distal end, wherein the driver further includes a driven gear system coupled with the magnetic actuator, wherein the load sensor is proximal to the driver, and wherein the driven gear system is distal to the load sensor. In some aspects, the interface between the housing and the driven gear system has a slip fit enabling translation of force measurement.

In particular cases, the load sensor includes a bi-directional load sensor coupled with the driver and configured to indicate both a compressive load and a tensile load applied by the driver to the first adjustment rod.

In some aspects, the load sensor is rotationally fixed relative to the housing. In certain examples, the rotationally fixed load sensor prevents rotation.

In certain implementations, the load sensor includes a button-type load cell. In certain examples, the button-type load cell is configured to rotate.

In particular aspects, the load sensor is configured to monitor the load applied by the driver on the first adjustment rod during adjustment of the first adjustment rod.

In some cases, in a portion of the housing in which the load cell is disposed, the housing has a non-circular cross-section that limits rotation of the load cell. In certain examples, the non-circular cross-section is oblong or hexagonal.

In certain aspects, the implant further includes a coupler holding the load cell in the portion of the housing. In certain examples, the coupler includes a snap ring or an o-ring.

In particular implementations, the load sensor includes a bi-directional load sensor coupled with the driver and configured to indicate both a compressive load and a tensile load applied by the driver to the first adjustment rod.

In some aspects, a proximal end of the first adjustment rod engages a lead screw and is configured to move with the lead screw.

In particular cases, the implant is an intermedullary implant.

In certain aspects, the implant is configured to aid in treatment of a limb length discrepancy or a bone defect in the patient's body.

In some cases, the load cell is configured to rotate with the driver relative to the housing.

In particular implementations, the load sensor includes a bi-directional load sensor coupled with the driver and configured to indicate both a compressive load and a tensile load applied by the driver to the first adjustment rod.

In some aspects, a proximal end of the first adjustment rod engages a lead screw and is configured to move with the lead screw.

In particular cases, the load sensor enables determination of the amount of movement of bone in the patient's body without imaging of the bone in the patient's body.

In certain implementations, the external control device is located proximate to the patient's body during expansion of the implanted distraction device.

In some cases, the external control device is remote relative to the patient's body during expansion of the implanted distraction device.

In particular aspects, determining the amount of movement of the bone in the patient's body includes converting the load sensor data into an estimated bone movement value.

In some implementations, the estimated bone movement value compensates for a margin of error.

In certain cases, the load sensor is connected with an external control device and is configured to wirelessly transmit load data to the external control device. In some examples, the external control device is located proximate to the patient or remote relative to the patient. In additional examples, the external control device includes an actuator for communicating with the driver in the implanted distraction device.

In certain implementations, the implants and methods enable enhanced lengthening rates for a patient.

Two or more features described in this disclosure, including those described in this summary section, may be combined to form implementations not specifically described herein.

The above presents a simplified summary in order to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

The details of one or more implementations are set forth in the accompanying drawings and the description below. Other features, objects and benefits will be apparent from the description and drawings, and from the claims.

Figure 1:
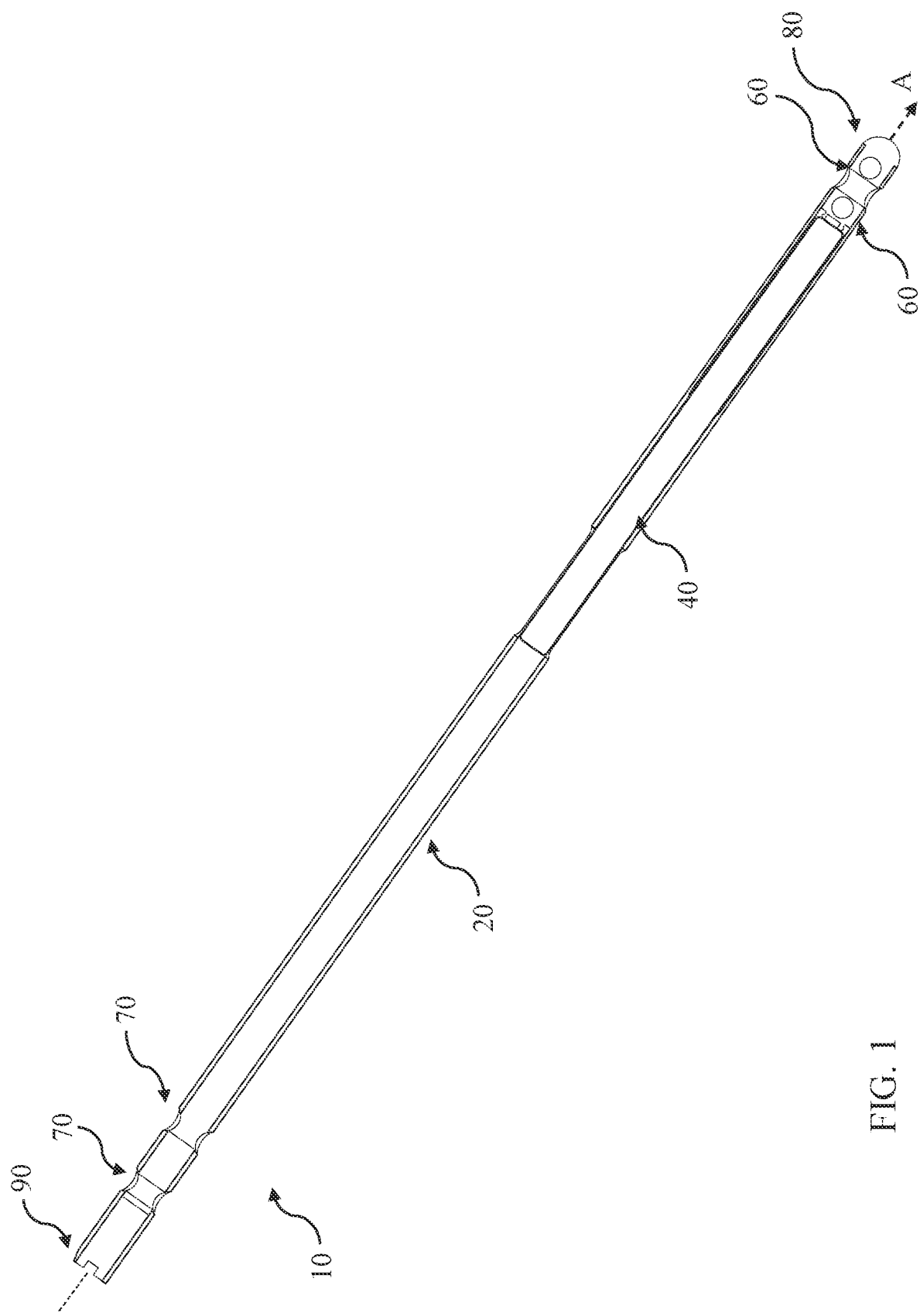
FIG. 1 shows a perspective view of an intermedullary implant according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

Implantable bone adjustment systems have significantly enhanced the lives of patients, for example, enabling dynamic, long term bone adjustment without significant intrusion in the patient's daily life. However, certain implantable bone adjustment systems may benefit from feedback on forces applied by the implant, for example, in real time.

This disclosure provides, at least in part, implants for moving bone in a patient's body, and methods that beneficially incorporate such implants to move bone. These implants include a load sensor within the implant housing that is configured to directly or indirectly indicate a load applied by the implant to the patient's bone(s). In particular examples, the implant includes a housing having a driver that is configured to drive an adjustment rod, and a load sensor positioned within the housing that is configured to indicate a load applied by the driver on the adjustment rod.

The various disclosed implementations can improve patient outcomes when compared with conventional implantable adjusters. The disclosed implementations can provide adaptability in adjusting bone positioning, enhancing one or both of intraoperative and postoperative engagement with the device. Additionally, the disclosed implementations can provide feedback about adjustment protocols for a particular patient and/or a group of patients to enhance adjustment outcomes for the individual and/or group. The implants described according to various implementations can also reduce health risks for patients when compared with conventional approaches, for example, allowing more aggressive (shorter) adjustment protocols and mitigating the need for imaging as a means of adjustment feedback. Further, the force sensors can provide feedback to tune an amount of therapy provided to the patient (e.g., by directly measuring force applied in addition to or instead of measuring other indirect parameters).

Figure 2:
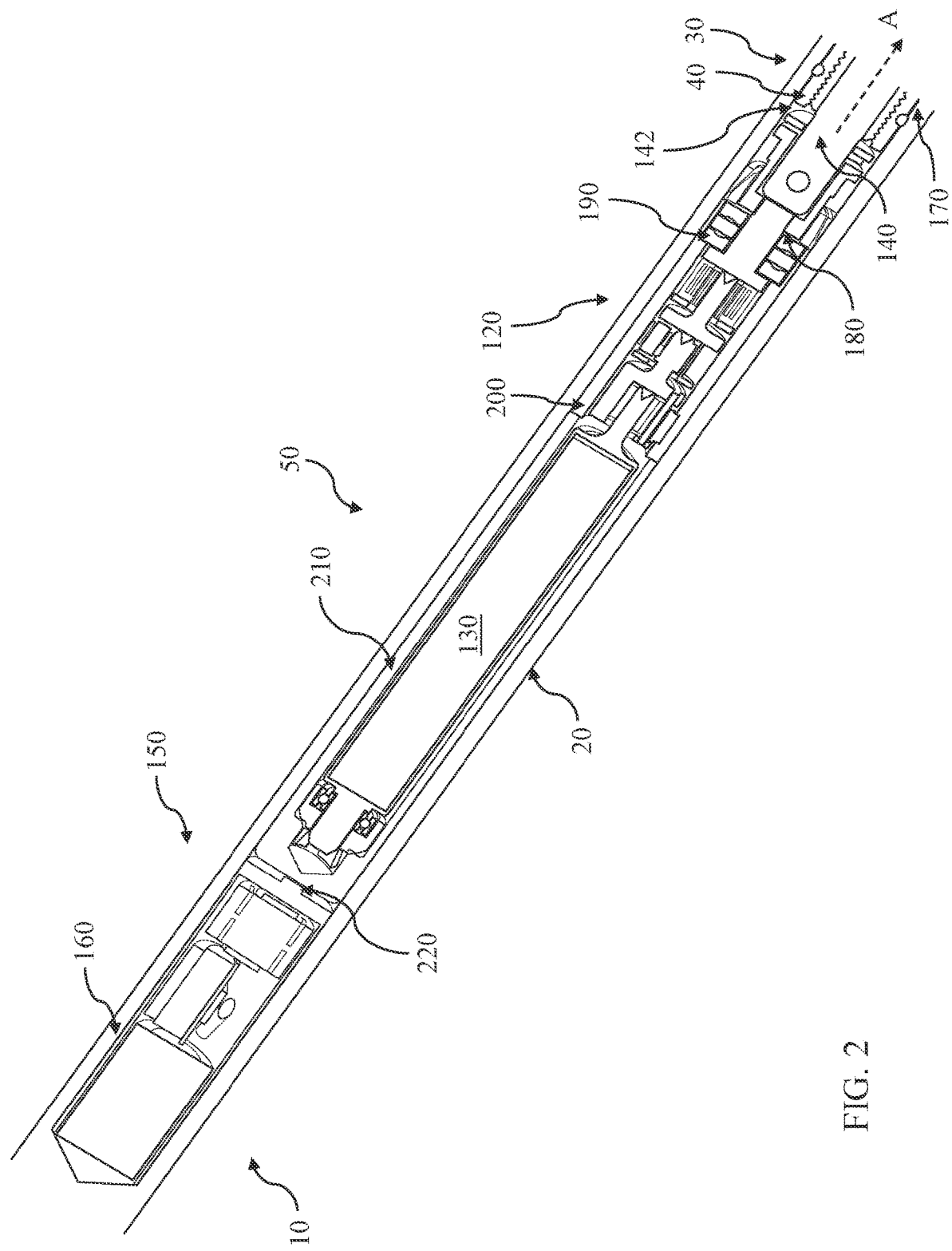
FIG. 2 shows a cross-section of an implant such as the implant in FIG. 1 according to various implementations.
Figure 3:
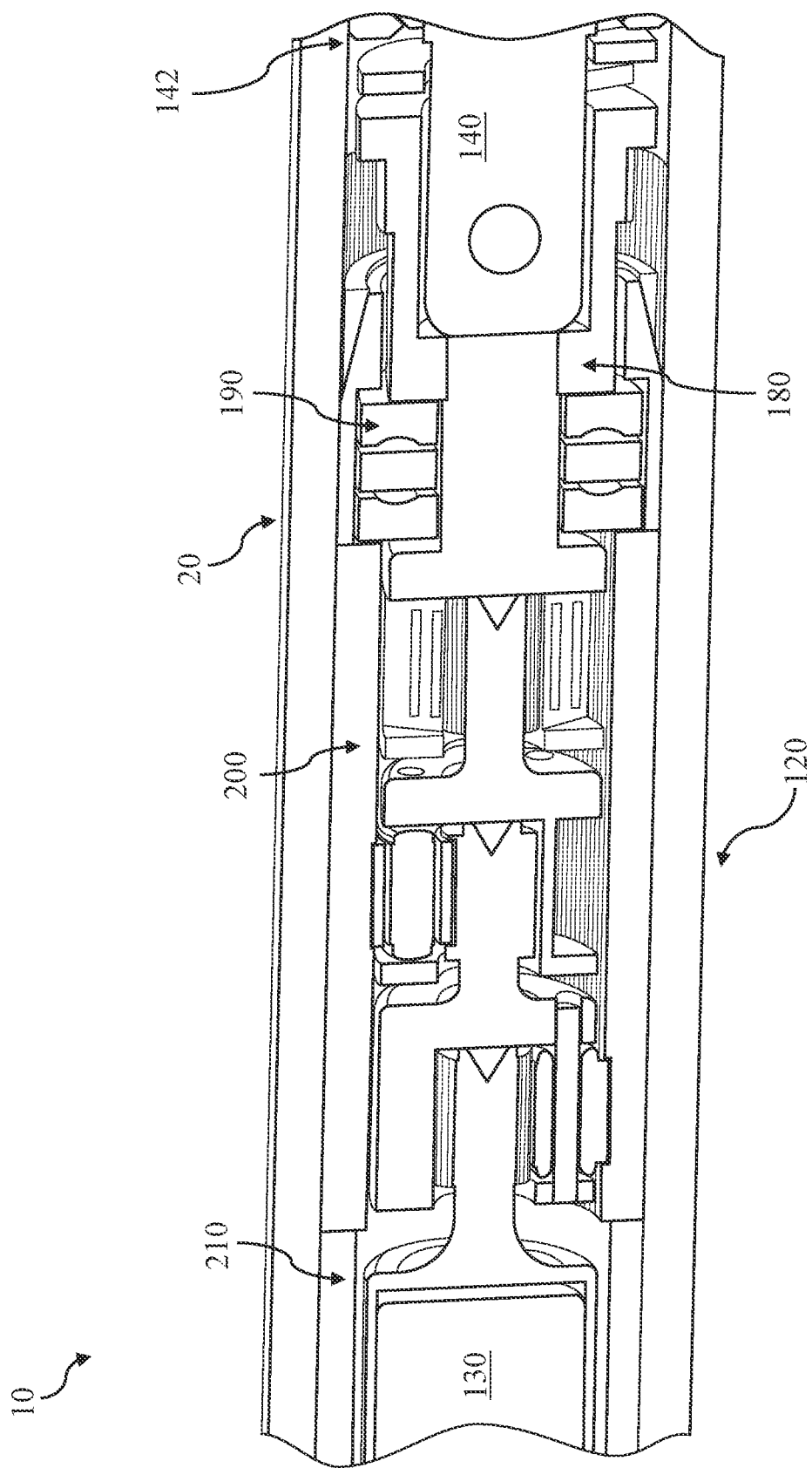
FIG. 3 is a close-up cross-sectional view of a portion of the implant of FIGS. 1 and 2 according to various implementations.
Figure 4:
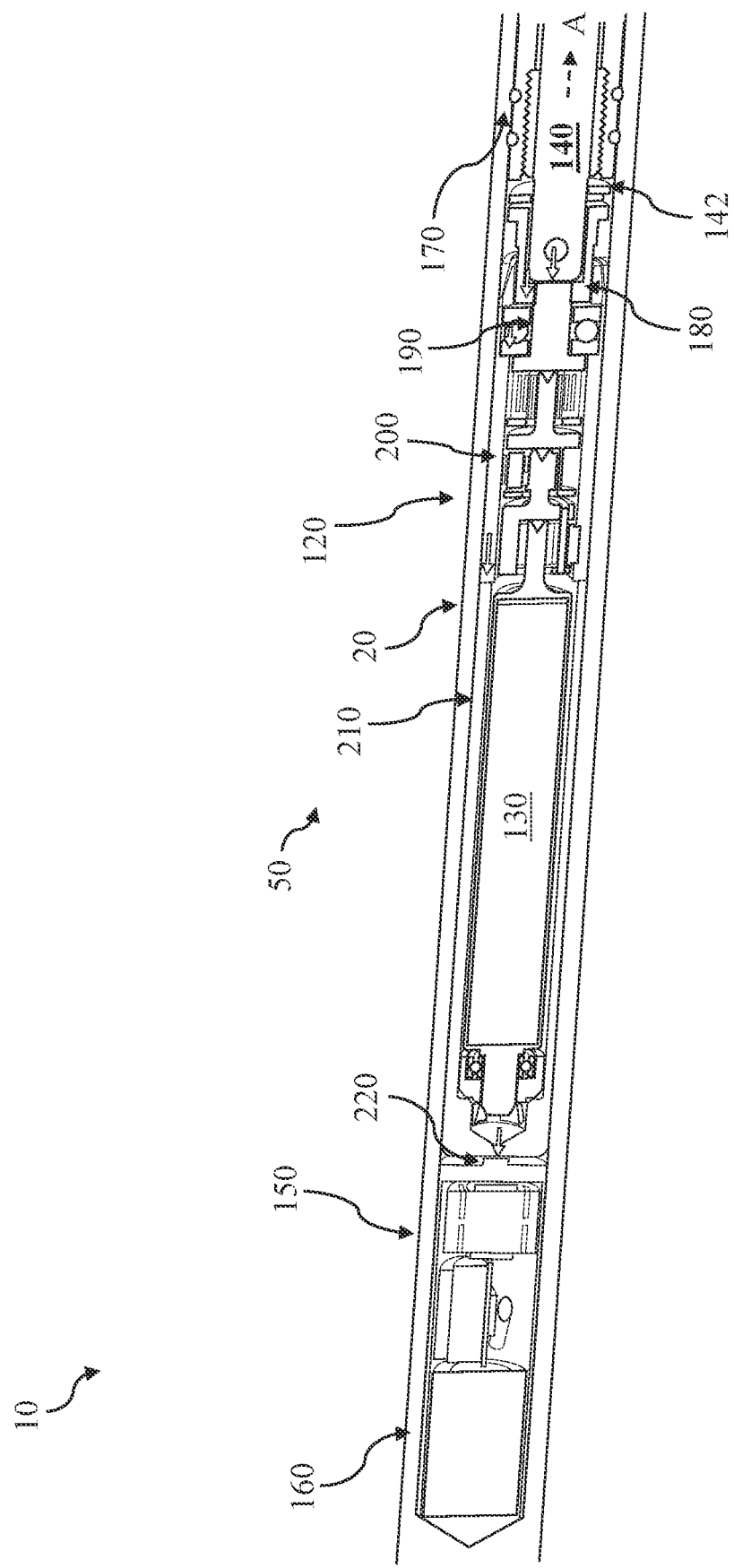
FIG. 4 is a force/load diagram of the implant of FIGS. 1-3, according to various implementations.

FIG. 1 shows a schematic perspective view of an implant 10 for moving bone in a patient's body according to various implementations. FIG. 2 shows a cross-sectional view of the implant 10. FIG. 3 shows a close-up view of a portion of the implant 10. FIG. 4 illustrates a schematic markup of load transfer locations (interfaces) in the implant 10. In particular implementations, the implant 10 (and other implants depicted and described herein) is configured for intermedullary placement in a patient, e.g., to aid in treatment of one or more patient conditions. In certain examples, the implant 10 can be used in a method of intermedullary adjustment of a patient's bone. In a particular example, the implant 10 (and other implant(s) herein) is configured to aid in treatment of a limb length discrepancy and/or a bone defect in the patient's body. In other implementations, the techniques described herein can be applied in non-intermedullary uses, such as for use with extramedullary plates, in the correction of scoliosis or for other uses.

With reference to FIGS. 1-4, in various implementations, the implant 10 includes an implantable biocompatible housing (or, "housing") 20. The housing 20 can include a first cavity 30, with a first adjustment rod 40 at least partially contained in the first cavity 30. A drive mechanism (or, driver) 50 is configured to drive the first adjustment rod 40 to enable movement, e.g., translation (also called "distraction") of the rod 40 axially relative to the housing 20 (relative to primary axis A). While described in terms of translation (distraction) in certain implementations, it is understood that additional implementations of an implant can include a driver configured to translate and/or rotate the first adjustment rod 40 and/or additional adjustment rods such as described in U.S. Patent Application No. 63/342,921 (Implant with Multi-Modal Adjustment, filed May 17, 2022), which is entirely incorporated by reference herein.

In various implementations, the housing 20 and the first adjustment rod 40 are each configured for coupling to a patient. In various implementations, the first adjustment rod 40 includes one or more holes 60 for passing an anchor with which to secure the implant 10 to the patient (e.g., to bone), as shown in FIG. 1. The housing 20 can also include one or more holes 70 for passing an anchor with which to secure the implant to the patient (e.g., to bone). Spacing of holes 60 relative to a distal end 80 of the implant 10, spacing of holes 70 relative to a proximal end 90 of the implant 10, dimensions of the holes 60, 70, and other dimensional aspects of the holes 60, 70 can be tailored for particular patient parameters and/or treatment profiles. In certain aspects, the anchors described herein can include bone screws or other bone fixators or connectors. Examples of bone screws and/or dimensional aspects of the holes 60, 70 are described in U.S. patent application Ser. No. 16/298,339, entirely incorporated by reference herein.

In certain cases, the first adjustment rod 40 can include two distinct portions, which can be telescopically actuated to apply translational pressure on the patient's bone. For example, portions of the first adjustment rod 40 can be configured to translate telescopically, e.g., as described with reference to FIGS. 1-5 of U.S. patent application Ser. No. 16/298,339, previously incorporated by reference herein. In certain cases, the drive mechanism includes at least one driver 50 that is configured to be actuated by an external control device. In some cases, the external control device includes an external actuator for communicating with the driver 50 from a location external to the patient's body, e.g., a magnetic controller and/or other wireless controller. In particular cases, the driver 50 is configured to control translation of the first adjustment rod 40. In certain implementations, the driver 50 includes a gear system (e.g., a driven gear system having with planetary gears) 120 for driving movement of the first adjustment rod 40. In some examples, the driven gear system 120 is coupled with a magnetic actuator (e.g., permanent magnet) 130 that is rotationally coupled to the driven gear system 120. However, other driving elements are suitable in place of a magnet. For example, in addition to or instead of the magnet-based driving, one or more of the driving elements can take the form of an implanted electric motor. The implanted electric motor can be powered by an external power source (e.g., via a radiofrequency link, via an inductive connection, or via another technique). The implanted electric motor can be powered by an implanted power source (e.g., a battery, which may be charged by the external power source). The implanted power source may be within the implant (e.g., within a housing thereof) or separate from the implant and coupled to the implant via a cable. In certain cases, the driven gear system 120 is mounted with radial bearings and/or thrust bearings to a lead screw 140 that drives translation of the first adjustment rod 40. That is, a proximal end 142 of the first adjustment rod 40 engages the lead screw 140 and is configured to move with the lead screw 140. As noted herein, driver 50 can be configured to control translation of the first adjustment rod 40. In some cases, the driven gear system 120 can have a partially (or fully) slip-fit connection with the housing 20 that enables force to be transferred to a load cell 150, e.g., to provide accurate measurement of the load applied by the driven gear system 120 to the lead screw 140.

In particular cases, the implant 10 further includes a load sensor 150 positioned within the housing 20 and configured to indicate a load applied by the driver 50 to the first adjustment rod 40. In some cases, the load sensor 150 is configured to monitor the load applied by the driver 50 on the first adjustment rod 40 during adjustment of the first adjustment rod 40. As descried according to various implementations, the load sensor 150 can include a bi-directional load sensor that is coupled with the driver 50 and is configured to indicate both a compressive load and a tensile load applied by the driver 50 to the first adjustment rod 40. In additional implementations, the load sensor 150 can include a single-directional load sensor coupled with the driver 50 that is configured to indicate one of a compressive load or a tensile load applied by the driver 50 to the first adjustment rod 40. In certain implementations, the load sensor 150 is rotationally fixed relative to the housing 20, e.g., to prevent rotation during driving of the first adjustment rod 40. In additional implementations, the load sensor 150 is able to rotate relative to the housing 20. In a particular example illustrated in FIG. 2, the load sensor 150 includes a button-type load cell, which in certain cases, is able to rotate relative to the housing 20.

In particular implementations, for example as illustrated in FIGS. 2 and 4, the implant 10 further includes a communication device 160 that is configured to transmit data from the load sensor 150. In certain cases, the communication device 160 includes a wireless transmitter including and/or coupled with a processor or set of processors that is configured to cause the transmitter to transmit data from the load sensor 150. In various implementations, the communication device 160 enables wireless communication with an external control device, e.g., by enabling transmission of data such as load data from the load sensor 150. In particular examples, the load sensor 150 is connected with an external control device and is configured to wirelessly transmit load data to the external control device. In some examples, the external control device is located proximate to the patient or remote relative to the patient. In additional examples, the external control device includes an actuator for communicating with the driver in the implant 10.

Turning to FIGS. 2-4, in particular implementations, the housing 20 is shown with the cavity 30 that has an opening 170. In certain cases, the first adjustment rod 40 is at least partially disposed within the cavity 30. In additional implementations, the load sensor 150 is positioned within the housing 20, where the driver 50 is located between the load sensor 150 and the opening 170. That is, in various implementations, the load sensor 150 is proximal to the driver 50 (i.e., closer to the proximal end 90 of the implant 10), and the driver 50 is distal to the load sensor 150 (i.e., closer to the distal end 80 of the implant 10).

In particular implementations, as illustrated in the example depiction in FIGS. 2-4, the implant can include a button-type load sensor 150 (or, load cell) that is configured to detect a load applied to the first adjustment rod 40. In such cases, the load sensor 150 can be configured to rotate relative to the housing 20, e.g., about the primary axis (A) of the implant 10. In particular, FIG. 4 illustrates an example of force/load transfer between components in the implant 10 as detected by the load sensor 150. The force (load) transfer diagram illustrates reactive forces that are transferred to the load sensor 150 caused by actuation of the driver 50. As shown, load is transferred at a first stage (1) from the lead screw 140 to a coupler 180, at a second stage (2) from the coupler 180 to a thrust bearing 190, at a third stage (3) from the thrust bearing 190 to a ring gear 200, at a fourth stage (4) from the ring gear 200 to a magnet housing 210 for the magnetic actuator (magnet) 130, and at a fifth stage (5) from the magnet housing 210 to the load sensor 150 (e.g., to a button interface 220 at the load sensor 150). In particular implementations, the button-type load sensor 150 and configuration illustrated in FIGS. 2-4 is suited for detecting a compressive load. A button-type load sensor 150 can have a cylindrical shape. In this example, the load sensor 150 is configured to detect the load applied by the driver 50 on the first adjustment rod 40, and in particular cases, transmit that load data to an external control device (e.g., via communication device 160 and associated processor(s)). In certain cases, the processor(s) can be coupled with memory for storing load data locally. In additional cases, the external control device can include memory for storing load data.

Figure 5:
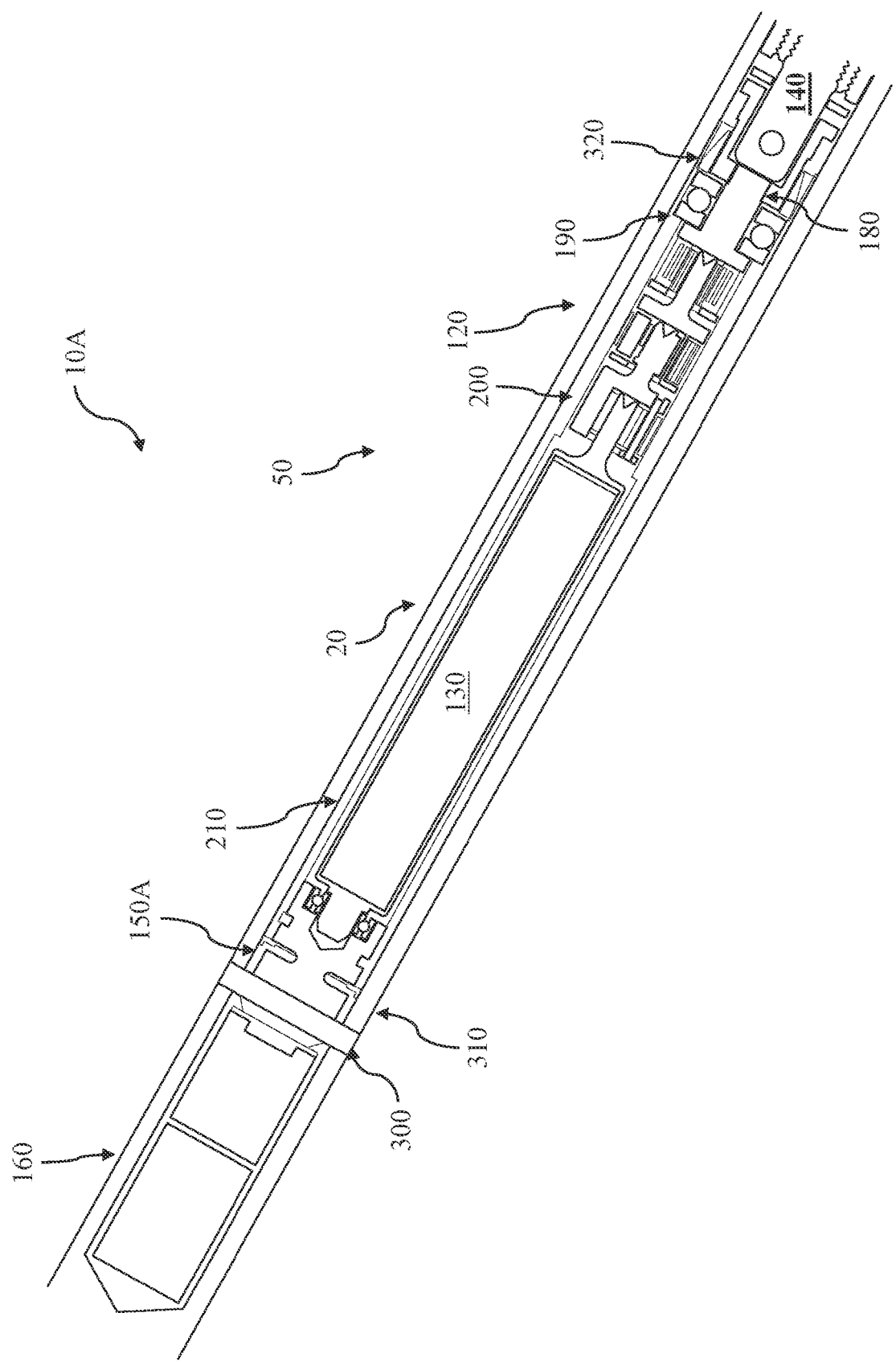
FIG. 5 shows a cross-section of a portion of an implant according to various additional implementations.
Figure 6:
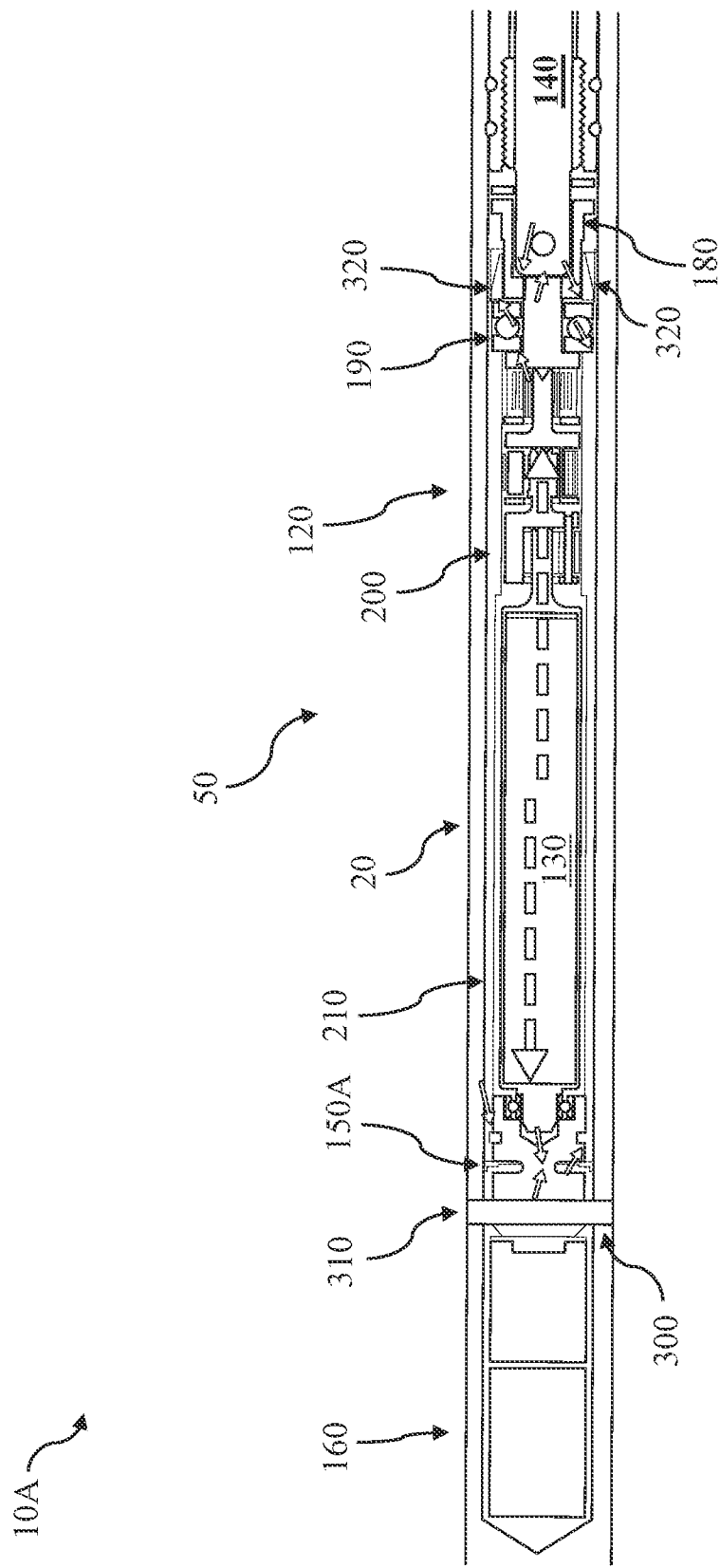
FIG. 6 is a force/load diagram of the implant of FIG. 5 according to various implementations.

FIGS. 5 and 6 illustrate another implementation of an implant 10A according to the disclosure. FIG. 5 shows a cross-section of the implant 10A, and FIG. 6 is a schematic force/load transfer diagram of the implant 10A. According to certain implementations, a load sensor 150A in the implant 10A is rotationally fixed relative to housing 20. That is, in certain implementations, a coupler 300 holds the load sensor 150A in a portion 310 of the housing 20. In certain cases, the load sensor 150A anchors to the housing 20 with a coupler 300 that includes one or more pins, screws, bolts, etc. According to some implementations, the load sensor 150A directly contacts the magnet housing 210 for the magnetic actuator 130. In particular cases, the fixed position of the load sensor 150A (e.g., via coupler 300 such as pin(s), screw(s), bolt(s), etc.) enables the load sensor 150A to detect both compressive and tensile loads translated from the adjustment rod 40. In certain cases, the coupler 300 can include a set of spring-loaded pins (e.g., two pins) that mate with recesses in the housing 20, thereby retaining the load sensor 150A in the housing 20 without extending through the outer surface of the housing 20. In any case, as noted herein, the implant 10A can be configured to detect one or both of compressive and tensile loads, e.g., to aid in determining operating parameters of the implant 10A in the patient's body. FIG. 6 illustrates load transfer in both compressive and tensile modes. Load transfer in compressive mode is similar to the description in FIG. 4. In tensile mode, tension on the lead screw 140 is transferred to coupler 180, which is then transferred to the opposite side of the thrust bearing 190, then to the edge of a wedge lock 320, from the wedge lock 320 to the ring gear 200/magnet housing 210 interface, and then from the magnet housing 210 to the load sensor 150A.

Figure 7:
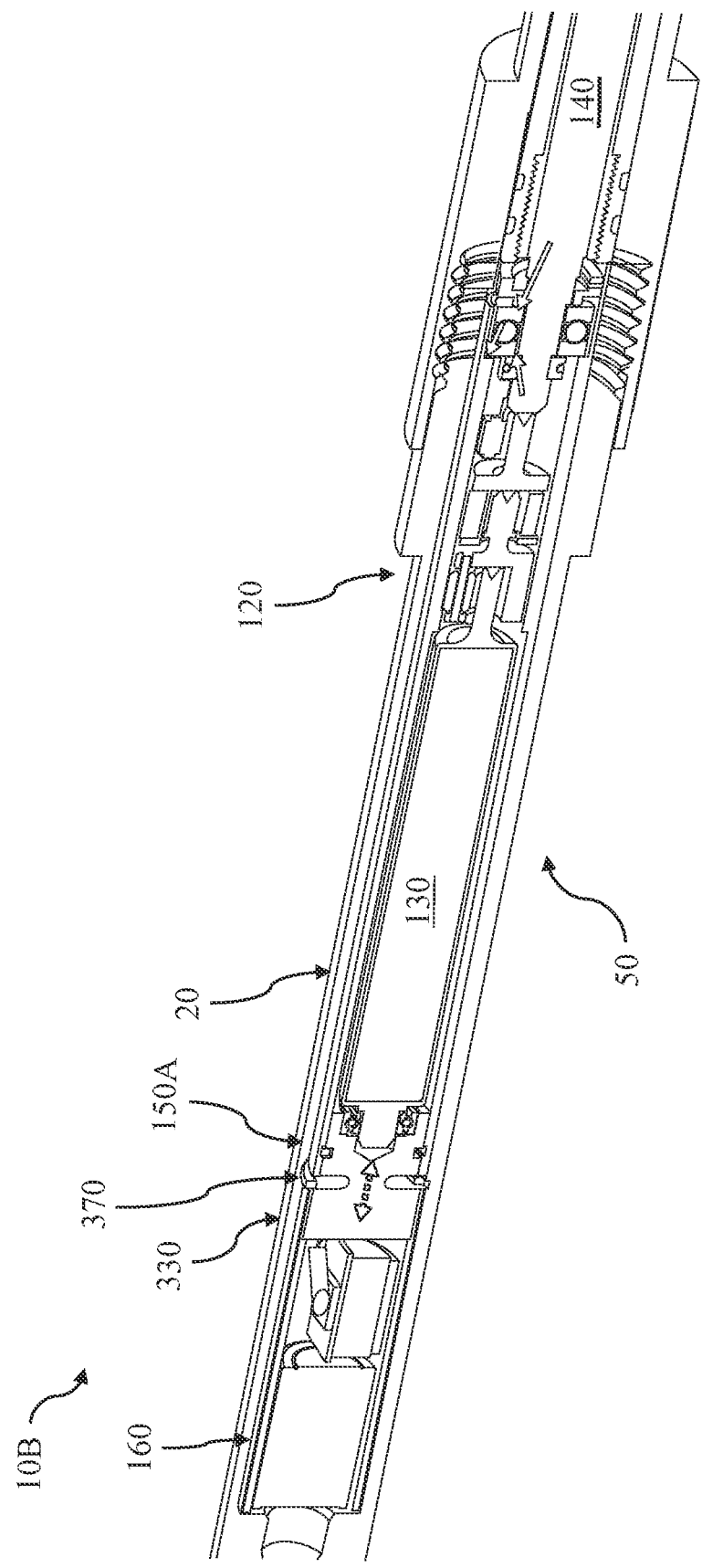
FIG. 7 shows a cross-section of a portion of an implant according to various implementations.
Figure 8:
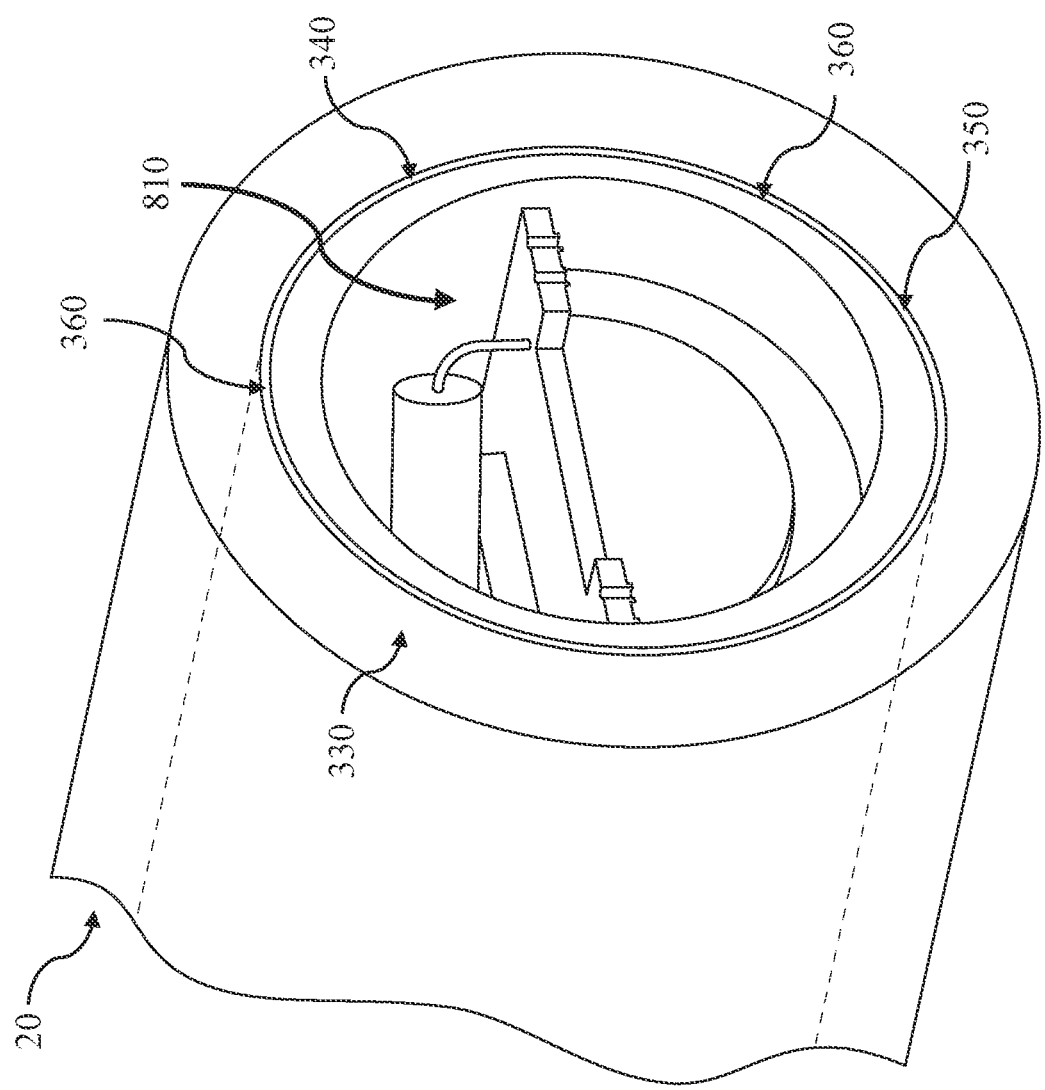
FIG. 8 shows a close-up cross-sectional view of a portion of the implant in FIG. 7 according to various implementations.

FIGS. 7-10 illustrate another implant 10B according to additional implementations. As described herein, a portion of the housing 20 in the implant 10B is configured with a torque limiting (or rotation limiting) feature. In one example, as shown in FIG. 7, a portion 330 of the housing 20 in implant 10B houses a load sensor 150A, such as a bi-directional load sensor similar to load sensor 150A in FIG. 6. In these embodiments, the portion 330 of the housing 20 in which the load sensor 150A is disposed has a non-circular cross-section 340 that limits rotation of the load sensor 150A. In certain cases, the load sensor 150 is approximately non-circular, and in particular cases, complements the non-circular cross-section 340 of the housing. In other cases, the load sensor 150 is approximately circular, and interferes with the non-circular cross-section 340 of the portion 330 of housing 20. FIG. 8 shows a close-up perspective of the non-circular cross-section 340 illustrating example rotation limiting features of the housing 20. That is, an inner wall (surface) 350 of the housing 20 is non-circular (e.g., oblong, hexagonal, etc.) and an outer wall (surface) 360 of the load sensor 150A is non-circular, or approximately circular, causing interference between the two surfaces 350, 360. In certain implementations, a coupler 370 holds the load sensor 150A in the portion 330 of the housing 20. The coupler 370 can include a snap-ring, o-ring, or other retaining feature that is at least partially circumferentially disposed about a recess (or, notch) 380 in the outer surface 360 of the load sensor 150A.

In addition, FIG. 8 illustrates circuitry 810. The circuitry 810 can be electrically connected to one or more of the load sensors 150. The circuitry 810 can include one or more power storage components, such as one or more batteries or capacitors. The power storage components can provide power for one or more other components of the circuitry 810 or other components of the implant 10, such as one or more of the load sensors 150. The circuitry 810 can include one more power generation components, such as may be used to obtain power from movement of the implant 10 (e.g., as caused by movement of the recipient of the implant) or conditions around the implant (e.g., temperature). The circuitry 810 can include one or more microcontrollers (e.g., one or more processors, such as central processing units) and/or memory circuits. The circuitry 810 can also include one or more components configured for bi-directional or uni-directional. communication with an external device. The communication can include receiving power from an external device (e.g., to charge one or more of the power storage components). The communication can include receiving commands from an external device. The communication can include providing data to an external device (e.g., load data from the one or more load sensors). The circuitry 810 can include one or more aspects, configurations, or components as described in US 2020/0253588 (filed 2020 Feb. 7), U.S. Pat. No. 11,389,111 (filed 2019 Jan. 17), and US 2019/

0254712 (filed 2019 Apr. 30), which are each hereby incorporated herein by reference in their entirety for any and all purposes.

Figure 9:
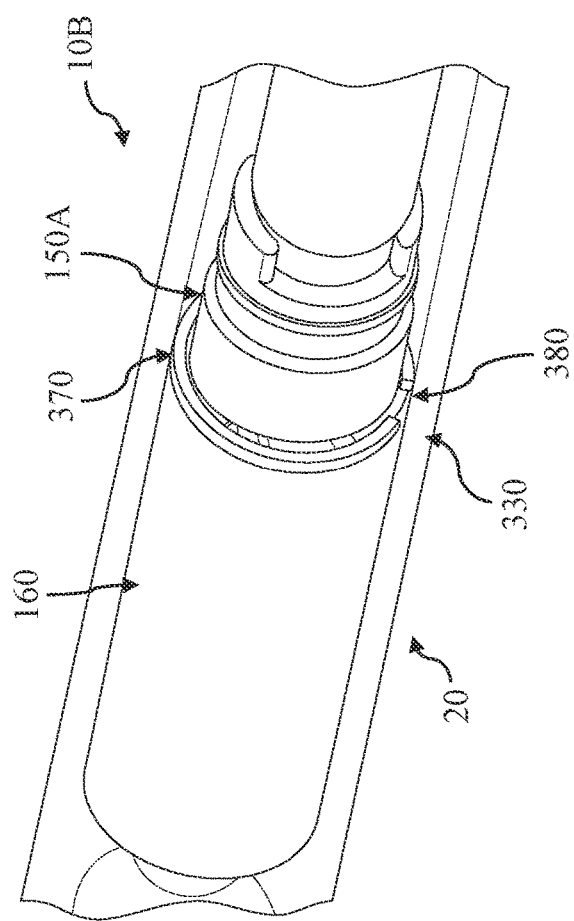
FIG. 9 shows a partially transparent perspective view of a portion of an implant according to various implementations.
Figure 10:
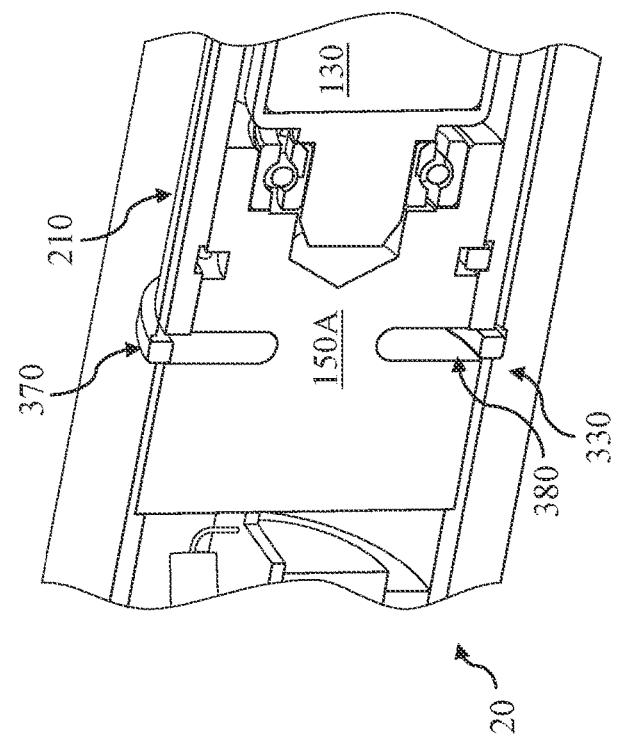
FIG. 10 shows a cross-section of a portion of the implant in FIGS. 7-9, according to various additional implementations.

FIGS. 9 and 10 illustrate partially transparent and cross-sectional views, respectively, of a portion of the implant 10B that includes the coupler 370. In certain implementations, the coupler 370 aids in retaining the load sensor 150A in the housing 20, e.g., axially, or in the proximal-distal direction.

Figure 11:
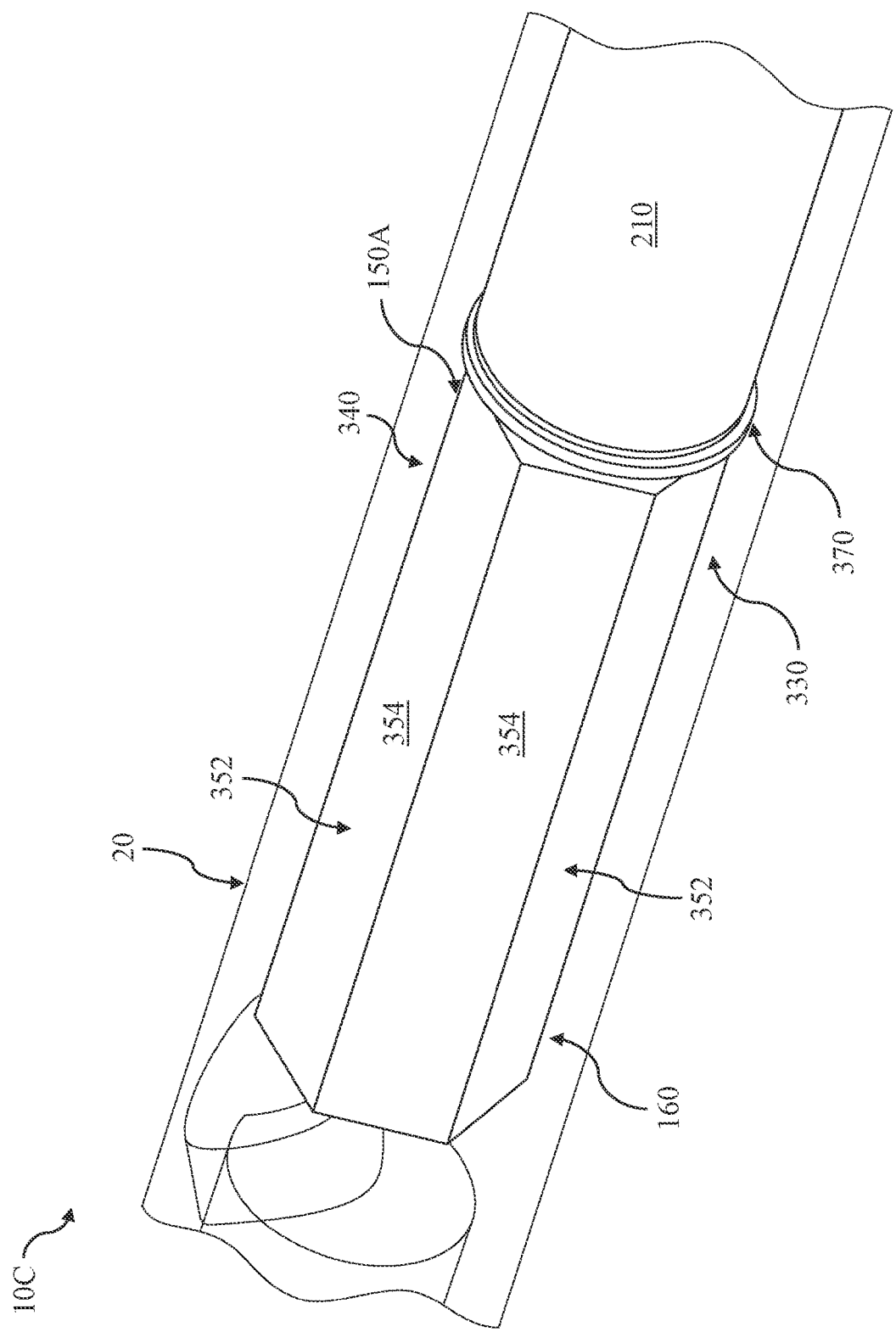
FIG. 11 shows a partially transparent perspective view of a portion of an implant according to various implementations.
Figure 12:
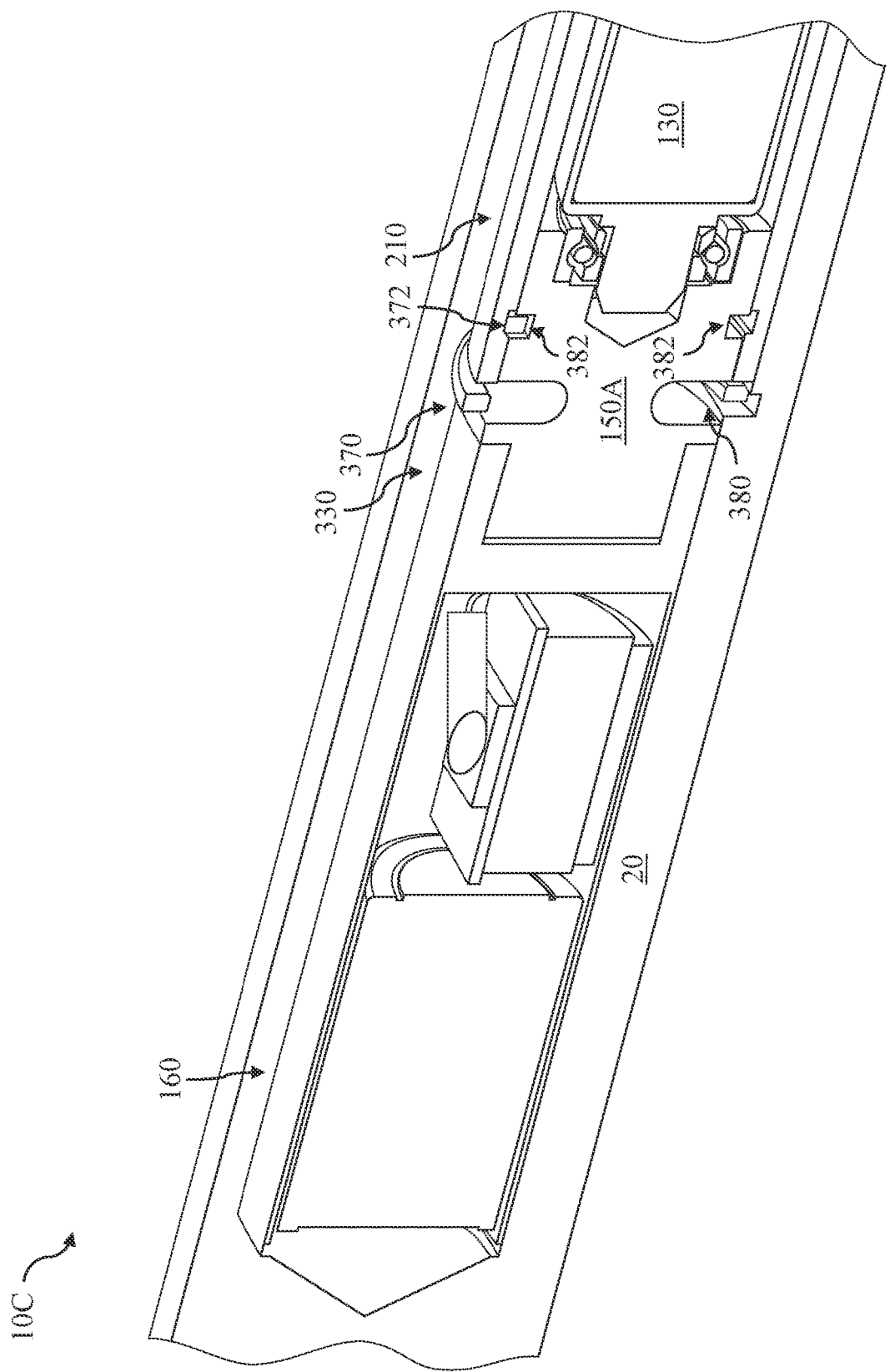
FIG. 12 shows a cross-section of a portion of the implant in FIG. 11 according to certain implementations.

FIGS. 11 and 12 show partially transparent perspective, and a cross-sectional views, respectively, of another implant 10C according to various implementations. Similar to implant 10B, in implant 10C, a portion 330 of the housing 20 houses a load sensor 150A, such as a bi-directional load sensor. In these embodiments, the portion 330 of the housing 20 in which the load sensor 150A is disposed has a non-circular cross-section 340 that limits rotation of the load sensor 150A. In a particular example, the inner wall (surface) 350 of the housing 20 includes at least one flat section 352, and in more particular cases, includes a plurality of flat sections 352. In particular cases, flat sections 352 of the inner wall (surface) 350 complement flat sections 354 of the outer surface 360 of the load sensor 150A. In certain examples, the inner wall (surface) 350 of the housing has an approximately hexagonal cross-section. In additional implementations, the outer surface 360 of the load sensor 150A is circular or approximately circular, causing interference between the two surfaces 350, 360. In certain implementations, a coupler 370 holds the load sensor 150A in the portion 330 of the housing 20. The coupler 370 can include a snap-ring, o-ring, or other retaining feature that is at least partially circumferentially disposed about the recess (or, notch) 380 in the outer surface 360 of the load sensor 150A. In certain implementations, the coupler 370 aids in retaining the load sensor 150A in the housing 20, e.g., axially, or in the proximal-distal direction. In additional implementations, a second coupler 372 (e.g., a snap ring or o-ring) is positioned between a second recess (or, notch) 382 in the load sensor 150A and the magnet housing 210, e.g., to secure the load sensor 150A to the magnet housing 210 and connected ring gear 200.

Figure 13:
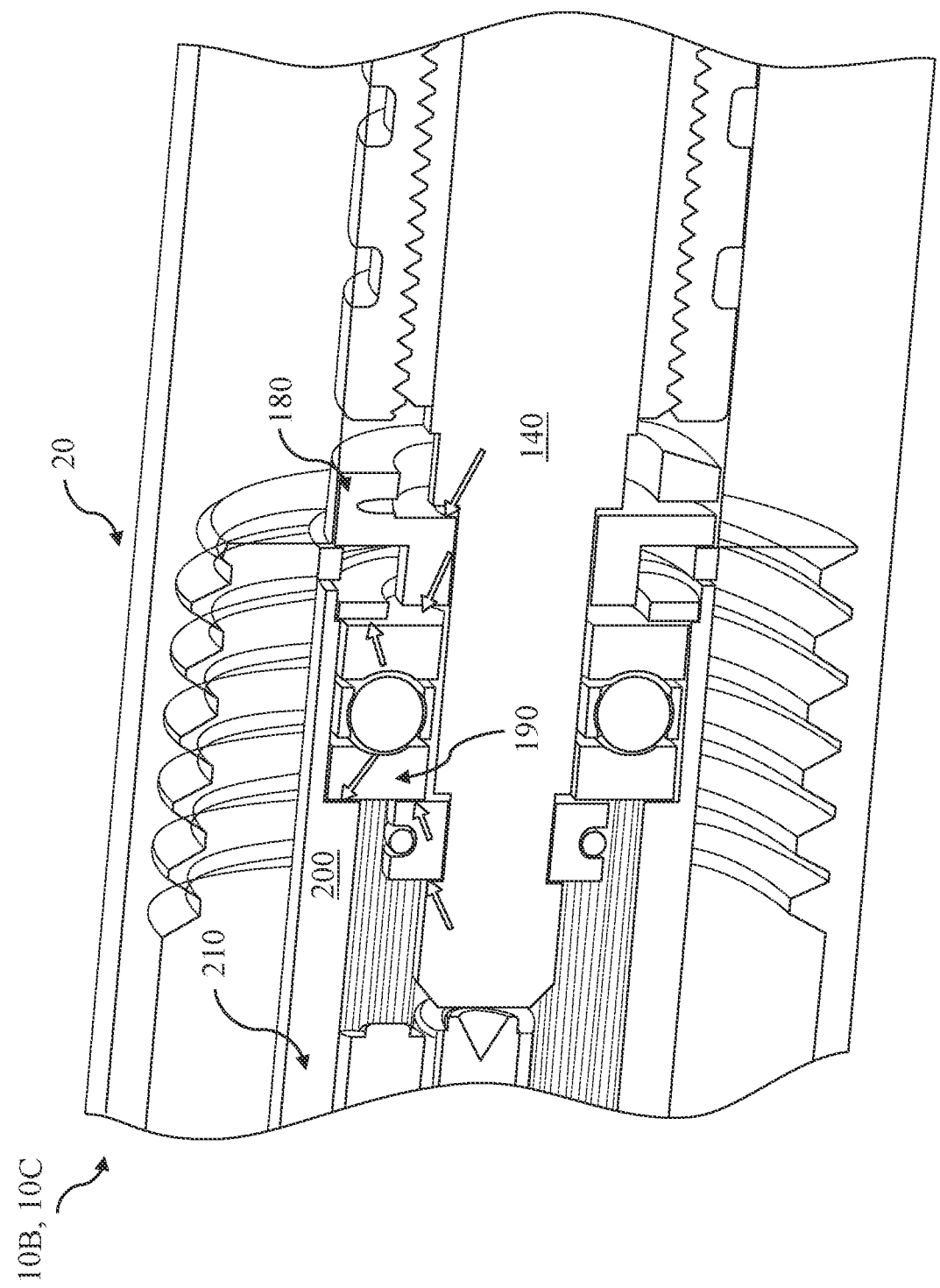
FIG. 13 is a force/load diagram of the implant of FIG. 12 according to various implementations.

FIG. 13 is an example force loading diagram for implant 10B and/or implant 10C according to various implementations. As illustrated, the bi-directional load sensor 150A is positioned to detect force applied to the interface of the magnet housing 210 and ring gear 200 from either direction (e.g., pulling or pushing). Regardless of the rotation-limiting shape of the load sensor and the housing, the ability to detect force loading will be approximately the same between both implants 10B and 10C.

Figure 14:
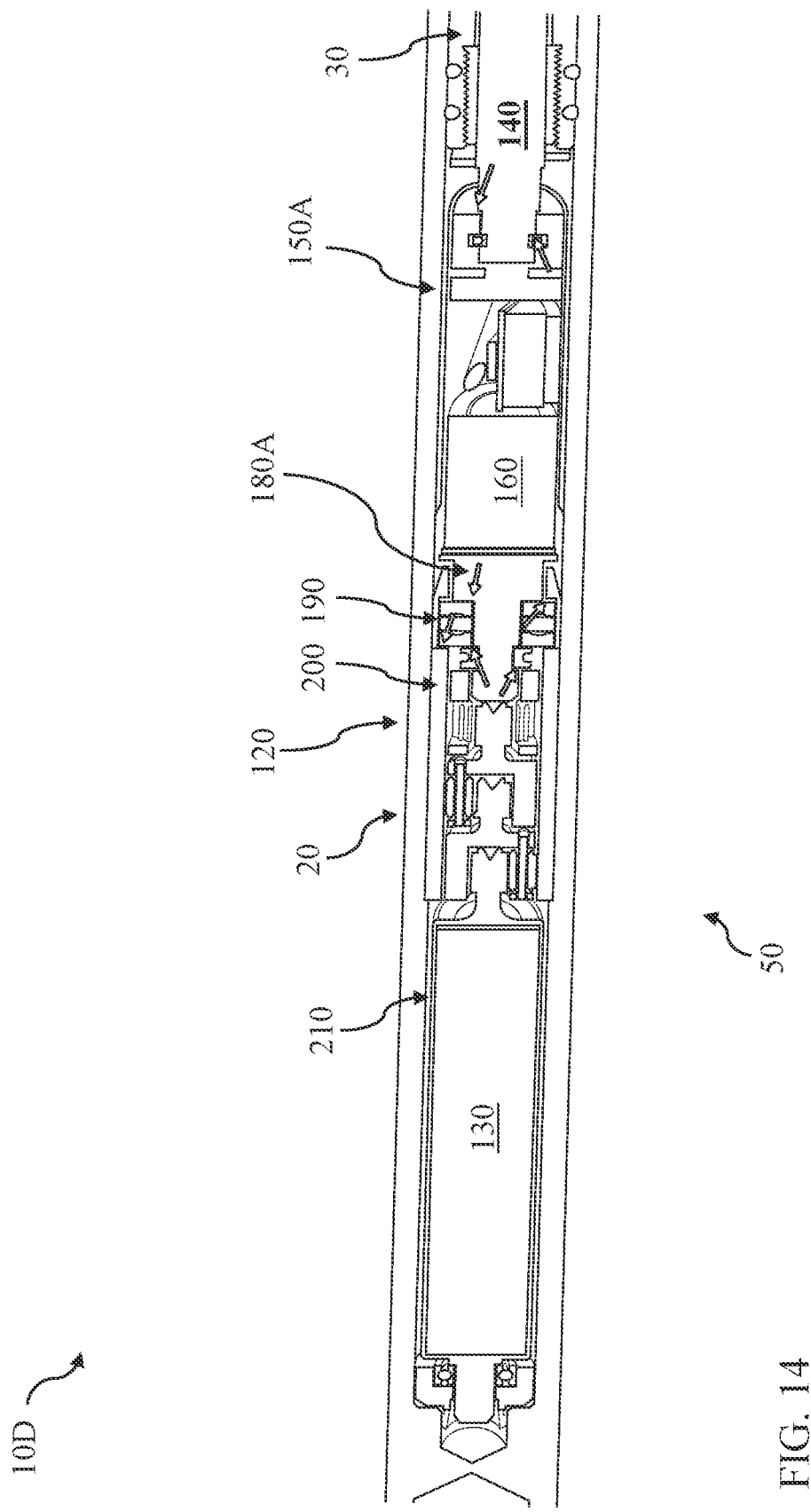
FIG. 14 is a cross-section of an implant, including force/load indicators, according to various additional implementations.

FIG. 14 illustrates a cross-section of an additional implant 10D according to various additional implementations. In contrast to certain other implants shown and described herein, implant 10D includes a load sensor 150A (e.g., bi-directional load sensor) that is positioned between (e.g., axially between, in the proximal-distal direction) the driven gear system 120 of the driver 50 and the first adjustment rod 40 for example, to indicate a load applied by the driver 50 on the first adjustment rod 40. In particular implementation, the load sensor 150A is directly coupled with the driver 50 (e.g., adjacent driven gear system 120) and is configured to rotate with the driver 50 relative to the housing 20. As with other implementations utilizing load sensor 150A, the implant 10D is configured to detect both compressive and tensile loads on the first adjustment rod 40 as indicated by tensile load arrows (left-to-right) and compressive load arrows (right-to-left) in FIG. 14. In these implementations, compressive loads can be detected via coupler 180A that is directly connected to the back (opposing) side of the load sensor 150A from the connection with the lead screw 140.

Figure 15:
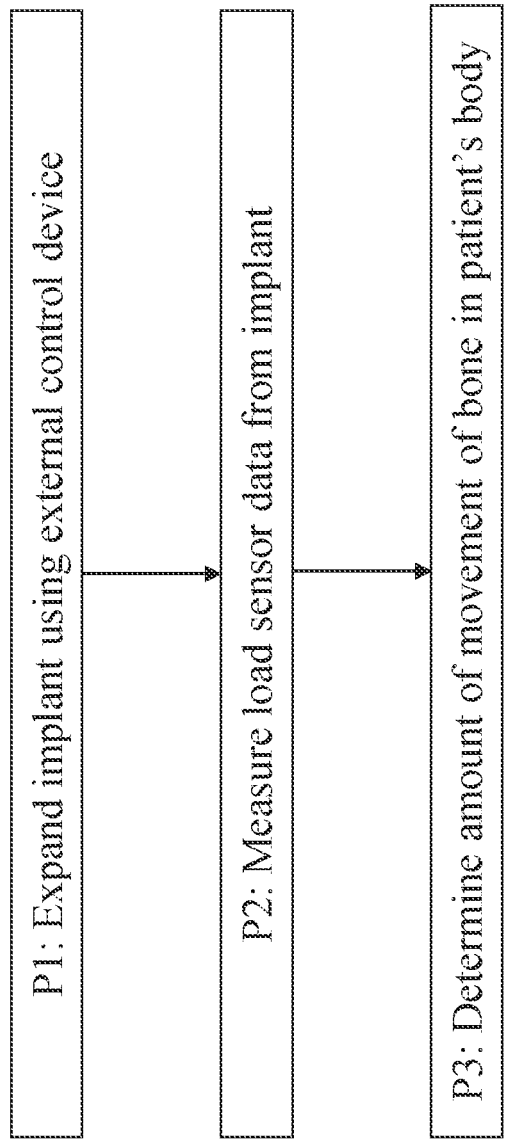
FIG. 15 is a flow diagram illustrating processes in a method according to various implementations.

FIG. 15 is flow diagram illustrating a method of using an implant (e.g., implant 10 or any of implants 10A-D) according to certain implementations. In various implementations, the process is performed while the implant is implanted within a patient, e.g., coupled to one or more bone segments in the patient. In a first process, P1: the implant 10 is expanded using an external control device such as a controller described herein. In certain cases, the external control device is located proximate to the patient's body during expansion of the implant 10. In other cases, the external control device is remote relative to the patient's body during expansion of the implant 10. Either contemporaneously with process P1 or following expansion in P1, in process P2, load sensor data is measured with a load sensor 150 of the implant 10 (e.g., load sensor 150 and/or load sensor 150A). Following measuring of the load sensor data with load sensor 150, in process P3, an amount of movement of bone in the patient's body is determined. In certain cases, determining the amount of movement of the bone in the patient's body includes converting the load sensor data into an estimated bone movement value. In some examples, a data model is used to estimate the bone movement value, e.g., applying a correspondence table or other calculation to account for load sensor data, patient-specific data, implant-specific data, etc. In particular cases, the estimated bone movement value compensates for a margin of error. In some examples, the movement is determined based on a known or estimated amount of load over time needed to move a particular amount of bone. The amount can be adjusted based on known movement of the patient. For example, an initial image of the region of interest can be taken, the implant can be actuated while load is measured, and a subsequent image can be taken. The amount of load can be correlated with changes in bone visible by a comparison between the initial and subsequent images. In some examples, changes in an amount of load can be used to determine an amount of bone movement or determine when a next bone adjustment can be made.

In any case, the use of the load sensor (e.g., load sensor 150 and/or load sensor 150A) enables determination of the amount of movement of bone in a patient's body without imaging of that bone. That is, the implants shown and described herein can reduce reliance on imaging as feedback for bone adjustment in patients, potentially reducing the patient's exposure to imaging-based radiation and additional complications.

Any implant shown and described herein (e.g., implants 10, 10A, 10B, 10C, 10D) can be configured for intermedullary placement in a patient, e.g., to aid in treatment of a limb length discrepancy or a bone defect in the patient's body. In certain cases, the implants described and depicted herein can be used in a method of intermedullary adjustment of a patient's bone, e.g., by inserting the implant(s) into the patient's body and by actuating the implant(s) using a controller such as an external control device. As noted herein, further processes in the methods can include measuring load sensor data from a load sensor at the implant, and determining an amount of movement of bone in a patient's body using the load sensor data.

Figure 16:
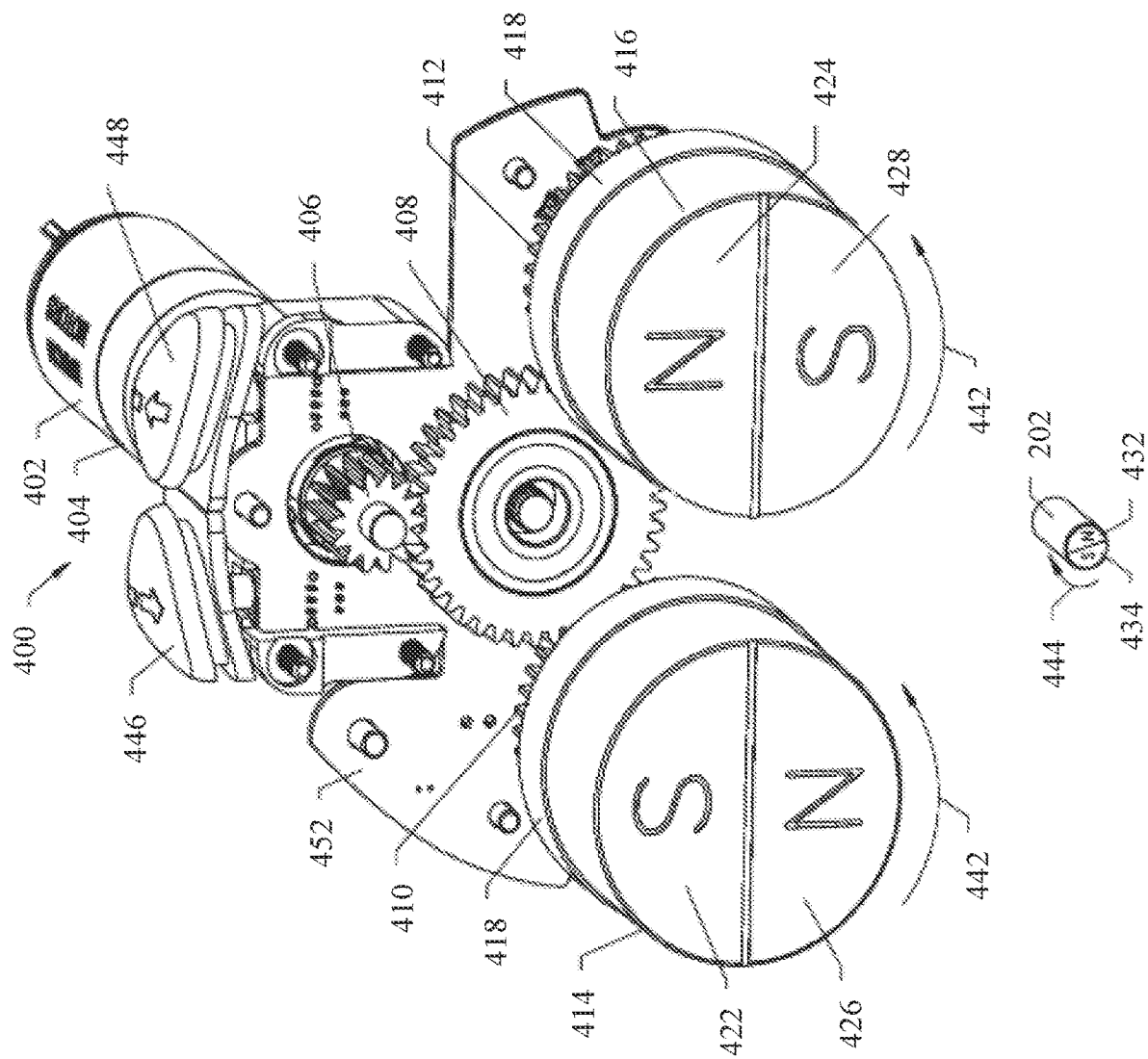
FIG. 16 shows the internal components of an external adjustment device for non-invasively adjusting a distraction and compression device according to various implementations.
Figure 17:
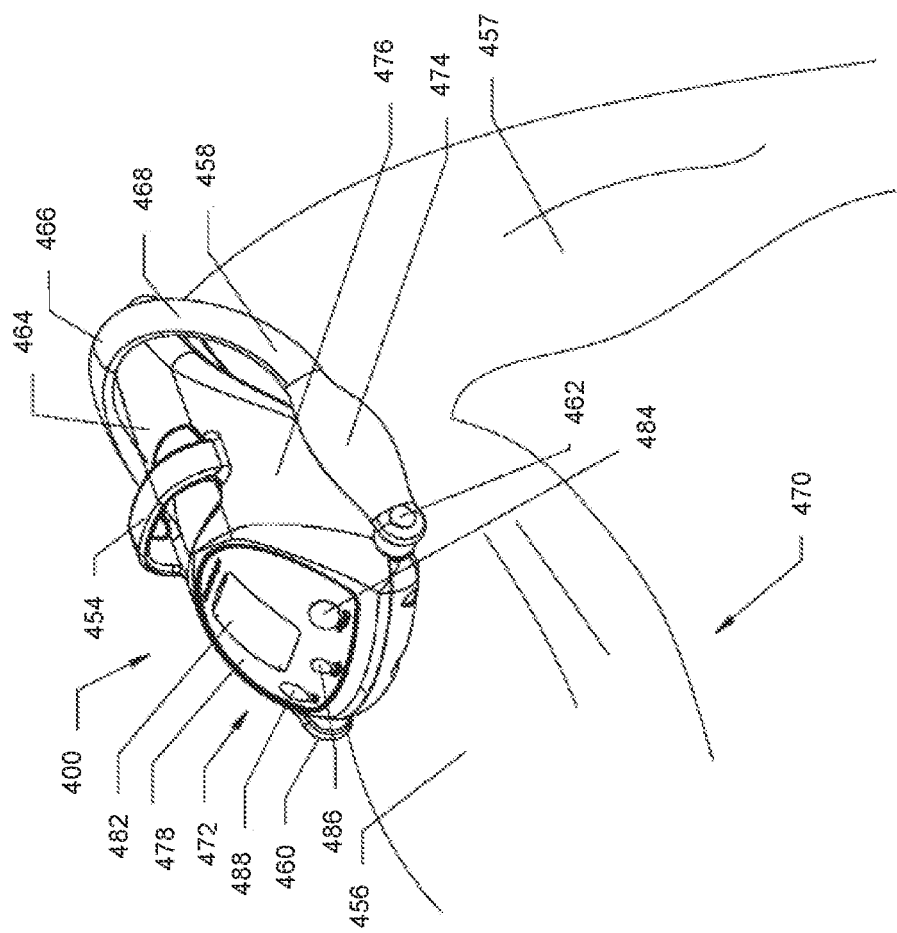
FIGS. 17 and 18 show external adjustment devices in configurations for adjusting a distraction and compression device implanted within a femur, and within a tibia, respectively, in accordance with various implementations.
Figure 18:
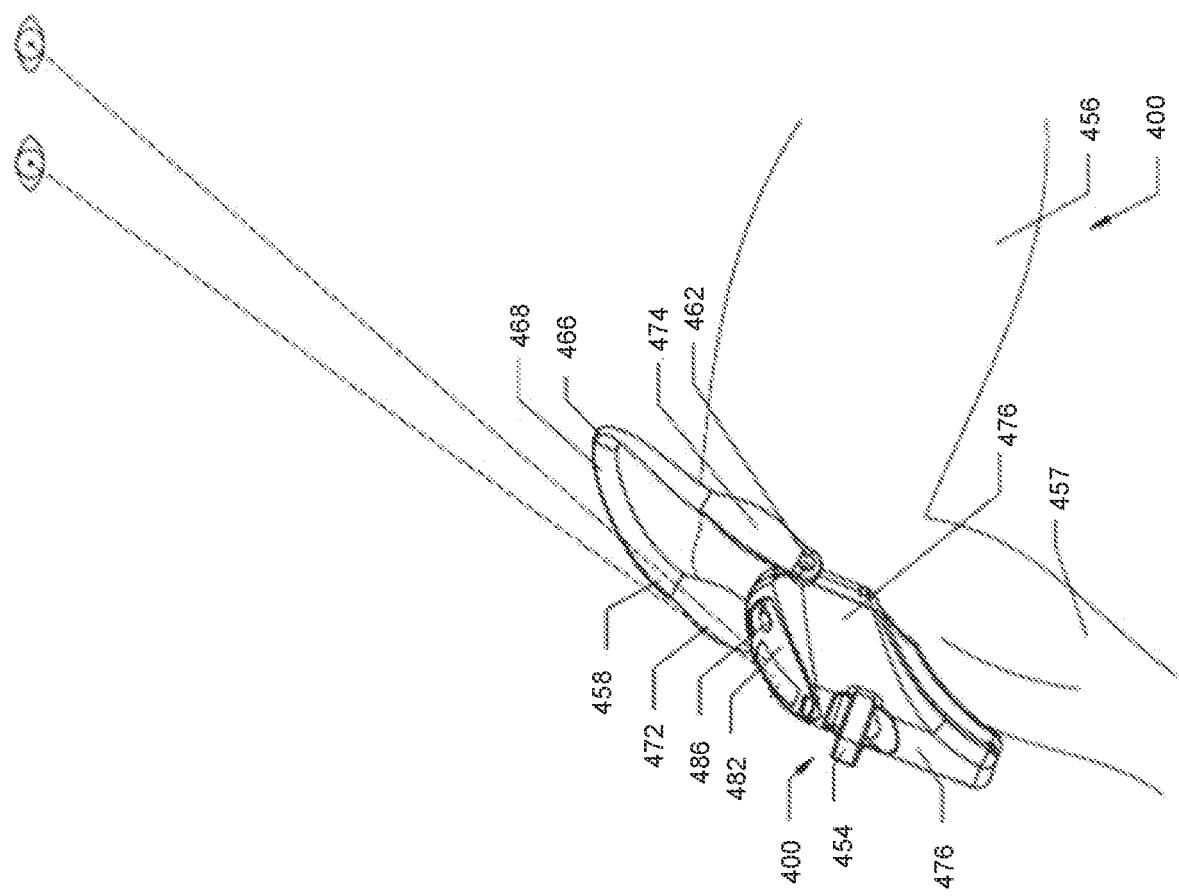

FIGS. 16-18 illustrate an external adjustment device 400 configured for applying a moving magnetic field to allow for non-invasive adjustment of the device 100 by turning a permanent magnet 202 within the device 100, as described. FIG. 16 illustrates the internal components of the external adjustment device 400, and for clear reference, shows the permanent magnet 202 of the device 100 without the rest of the assembly. The internal working components of the external adjustment device 400 may, in certain embodiments, be similar to those described in U.S. Patent Application Publication No. 2012/0004494, which is incorporated by reference herein. A motor 402 with a gear box 404 outputs to a motor gear 406. The motor gear 406 engages and turns a central (idler) gear 408, which has the appropriate number of teeth to turn a first magnet gear 410 and a second magnet gears 412 at identical rotational speeds. First and second magnets 414, 416 turn in unison with the first and second magnet gears 410, 412, respectively. Each magnet 414, 416 is held within a respective magnet cup 418 (shown partially). An exemplary rotational speed may be 60 RPM or less. This speed range may be configured to limit the amount of current density induced in the body tissue and fluids, to meet international guidelines or standards. As seen in FIG. 16, the south pole 422 of the first magnet 414 is oriented the same as the north pole 424 of the second magnet 416, and likewise, the first magnet 414 has its north pole 426 oriented the same as the south pole 428 of the second magnet 416. As these two magnets 414, 416 turn synchronously together, they apply a complementary and additive moving magnetic field to the radially-poled, permanent magnet 202, having a north pole 432 and a south pole 434. Magnets having multiple north poles (for example, two) and multiple south poles (for example, two) are also contemplated in each of the devices. As the two magnets 414, 416 turn in a first rotational direction 442 (e.g., counter-clockwise), the magnetic coupling causes the permanent magnet 202 to turn in a second, opposite rotational direction 444 (e.g., clockwise). The rotational direction of the motor 402 and corresponding rotational direction of the magnets 414, 416 is controlled by buttons 446, 448. One or more circuit boards 452 contain control circuitry for both sensing rotation of the magnets 414, 416 and controlling rotation of the magnets 414, 416.

FIGS. 17 and 18 show the external adjustment device 400 for use with a device 100 placed in the femur (FIG. 17) or the tibia (FIG. 18). The external adjustment device 400 has a first handle 454 for carrying or for steadying the external adjustment device 400, for example, steadying it against an upper leg 456 (as in FIG. 17) or a lower leg 457 (as in FIG. 18). An adjustable handle 458 is rotationally attached to the external adjustment device 400 at pivot points 460, 462. Pivot points 460, 462 have lockable/unlockable mechanisms, such as a spring-loaded brake, ratchet or tightening screw, so that a desired angulation of the adjustable handle 458 in relation to housing 464 can be adjusted and locked in orientation. Adjustable handle 458 is shown in two different positions in FIGS. 17 and 18. In FIG. 17, adjustable handle 458 is set so that an apex 466 of a loop 468 rests against housing 464. In this position, patient 470 is able to hold onto one or both of grips 472, 474 while the adjustment procedure (for example transporting bone between 0.10 mm to 1.50 mm) is taking place. It is contemplated that the procedure could also be a lengthening procedure for a bone lengthening device or a lengthening procedure for a lengthening plate which is attached external to the bone. Turning to FIG. 18, when the bone transport device 100 is implanted in a tibia, the adjustable handle 458 may be changed to a position in which the patient 470 can grip onto the apex 466 so that the magnet area 476 of the external adjustment device 400 is held over the portion of the device 100 containing the permanent magnet 202. In both cases, the patient 470 is able to clearly view control panel 478 including a display 482. In a different configuration from the two directional buttons 446, 448, in FIG. 16, the control panel 478 includes a start button 484, a stop button 486 and a mode button 488. Control circuitry contained on circuit boards 452 may be used by the surgeon to store information related to specific aspects of each particular patient. For example, in some patients an implant may be placed antegrade into the tibia. In other patients the implant may be placed either antegrade or retrograde about the femur. In each of these three cases, it may be desired to move the bone either from distal to proximal or from proximal to distal. By having the ability to store information of this sort that is specific to each particular patient within the external adjustment device 400, the external adjustment device 400 can be configured to direct the magnets 414, 416 to turn in the correct direction automatically, while the patient need only place the external adjustment device 400 at the desired position and push the start button 484. The information of the maximum allowable bone transport length per day and maximum allowable bone transport length per session can also be input and stored by the surgeon for safety purposes. These may also be added via a memory storage unit (e.g., an SD card, USB device, etc.), or by wireless input (e.g., Bluetooth, WiFi, etc.). An additional feature is a camera at the portion of the external adjustment device 400 that is placed over the skin. For example, the camera may be located between first magnet 414 and second magnet 416. The skin directly over the implanted permanent magnet 202 may be marked with indelible ink. A live image from the camera is then displayed on the display 482 of the control panel 478, allowing the user to place the first and second magnets 414, 416 directly over the area marked on the skin. Crosshairs can be overlaid on the display 482 over the live image, allowing the user to align the mark on the skin between the crosshairs, and thus optimally place the external adjustment device 400.

Other external adjustment devices can be used to cause actuation of the distraction devices described herein. Such external adjustment devices include, for example, those described in U.S. Pat. No. 8,382,756 filed on Nov. 20, 2009, U.S. Pat. No. 9,248,043 filed Jun. 29, 2011, U.S. Pat. No. 9,078,711 filed on Jun. 6, 2012, U.S. Pat. No. 9,044,281 filed on Oct. 18, 2012, U.S. application Ser. No. 14/698,665 filed on Apr. 28, 2015, U.S. application Ser. No. 14/932,904 filed on Nov. 4, 2015, U.S. Ser. No. 16/004,099 filed on Dec. 12, 2016, and App. No. PCT/US2020/017338 filed on Feb. 7, 2020, all of which are incorporated herein by reference as if set forth in their entirety.

Further, any implant described herein can be part of an implantable adjustment system that incorporates an external remote controller (ERC) or other external control device. In certain cases, the ERC can include a magnetic handpiece, a controller (or control box, e.g., with a processor), and a power supply. In additional implementations, the ERC or other external control device can include an interface such as a user interface for enabling a medical professional to interact with the system including implant(s) described herein. Additional details of an ERC and interaction with implants are described in U.S. patent application Ser. No. 16/298,339, previously incorporated by reference herein.

Even further, the implants, associated systems and controllers can include a communication system for connecting devices (e.g., via wireless or hard-wired means), or integral with particular devices (e.g., ERC). The communication system can include a number of hard-wired and/or wireless communication systems, with certain wireless systems configured to communicate over Bluetooth, Bluetooth Low Energy (BLE), radio frequency (RF), Wi-Fi, and/or ultrasound. In additional implementations, the communication system can include an independent subscriber identity module (SIM) assigned to each implant. In further cases, the communication system is configured to communicate wirelessly with a remote control system and/or data gathering/analysis platform, e.g., via a cloud-based communication protocol.

In particular cases, each implant is individually programmable to control an amount of the adjustment of the patient's bone. For example, implants described herein may each include an individually programmable or adjustable component (e.g., programmable controller and/or gear ratio, thread pitch and/or count, etc.) to control the amount of adjustment of the patient's bone. In certain cases, distinct implants in a system can be programmed or otherwise designated to perform distinct adjustments.

In additional cases, the controller(s) described herein includes a smart device (e.g., smart phone, smart watch, tablet, etc.) configured to operate a control platform for adjusting the implants. In these instances, the control platform can include a software application (or "app") configured to execute or otherwise run at a controller (e.g., ERC) for enabling control of one or more implants. According to certain implementations, the control platform enables control functions for one or more implants from a remote physical location relative to device 100. For example, the control platform can enable connection (e.g., network-based and/or cloud-based connection) between a system including the implant(s) described herein and a remote user such as a medical professional.

In all implementations described herein, the implant(s) can further include a feedback system in communication with one or more control devices (e.g., ERC and/or software application running control program). In certain cases, the feedback system provides feedback on a force response to the adjustment of the length of a given adjustment rod and/or rotation of a given adjustment rod. In certain cases, the feedback system includes a sensor onboard the implant, e.g., a sensor that is integrated with or coupled with the housing. Non-limiting examples of sensors can include a load cell, a piezo (piezoelectric) sensor, or an imaging sensor (e.g., optical sensor such as a camera, or an ultrasound sensor). Additional sensors that can be integrated in, or otherwise form part of the feedback system can include position and/or speed sensors (e.g., gyroscope/magnetometer, or inertial measurement unit (IMU)), temperature sensors and/or humidity sensors. In certain cases, the feedback system provides instructions to the controller (e.g., ERC) to modify actuation of a given implant based on the feedback on the force response.

In still further implementations, the sensor(s) in the feedback system described herein can be configured to provide data about a load exerted on an adjustment element, and/or a load exerted by the adjustment element on the patient's bone. The sensor(s) can also provide data about a tensile load between the implants and bone. In certain implementations, both tension and compression data are recorded by sensor(s) and provided to the feedback system for analysis and/or action (e.g., to adjust adjustment instructions). It is understood that tension and/or compression data detected by sensors, can represent an inferred or correlated indicator of the tension and/or compression applied to a device or component not physically in contact with the sensor. For example, the sensor on an instrument can be configured to detect tension at the instrument, while that torque is being translated to a driven element in contact with the distal end of the instrument. Similarly, the sensor on an instrument can detect compression at the instrument, while that compression is being translated to an external component, e.g., a driven element.

In additional implementations, one or more device components described herein, e.g., driving elements in implants, can be communicatively coupled with a navigation system that is configured to detect a position of the instrument(s). In one example, the control unit (e.g., ERC) can include or otherwise communicate with a navigation system in order to provide navigation information about a position of instruments. For example, the navigation system can include an optical tracking system such as a camera or laser-based tracking system, a Global Positioning System (GPS), an inertial measurement unit (IMU), an ultrasound based measurement system, other kinds of position systems, or combinations thereof. In certain cases, the navigation system is configured to determine a distance moved by the instrument when the instrument changes position, which the navigation system communicates to the control unit (e.g., for processing by the feedback system). One or more components of a navigation system can be located within or otherwise integrated with a housing that is mounted to or otherwise coupled with one or more of the device components.

In certain cases, a feedback system, or functions thereof, can be integrated into a control unit and/or a controller as described herein. In particular cases, the feedback system is part of a software application and is configured to determine what, if any, force adjustment should be made at a given implant based on the force feedback. In some examples, the feedback system includes a model that correlates force response and force applied during adjustment of the length of an implant. The model can be based at least in part on historical data from a set of implants in distinct bone fixation devices, e.g., similar to implant(s) described herein. According to various implementations, the model can be updated periodically, or on a continuous basis, to provide additional data about force response as compared to force applied in one or more implants. In certain cases, a version of the model can be downloaded or otherwise stored locally at one or more control units and/or controllers and periodically updated, e.g., via a cloud-based or other network-based software update. This approach can reduce the computational and/or storage requirements at control unit(s) and controller(s) that may be local to the implant(s).

In additional implementations, the feedback system is configured to provide post-operative data, post-adjustment data, and analysis of alignment procedure and/or device usage, e.g., to enhance future procedures and/or diagnose inefficiencies in a past procedure. In certain implementations, the feedback system is configured to update the control instructions for control unit(s) based on identified inefficiencies or errors in adjustment quantities (e.g., lengthening, rotation) and/or device usage during/after a given procedure. In particular implementations, the feedback system includes a logic engine configured to modify instructions iteratively, e.g., on a procedure-by-procedure or patient-by-patient basis.

Various additional aspects of the disclosure can include a method of intermedullary adjustment of a patient's bone using the implant(s) described herein. Using FIGS. 1 and 2 strictly for the simplicity of illustration, the method can include adjusting a patient's bone using an intermedullary implant such as implant 10 by: (i) coupling the implant 10 to the patient's bone (e.g., via bone screws or other fasteners at holes 60, 70); and (ii) actuating adjustment of the length of the implant 10 and/or actuating rotation of the implant 10 with an external control device (e.g., ERC or other remote controller). The adjusting of the length can occur before, during, or after adjusting of the rotation. In certain cases, after adjusting the patient's bone, a method can further include: (iii) decoupling the implant from the patient's bone (e.g., via bone screws or other fasteners at holes 60, 70).

In certain cases, a method can include imaging a bone connected with the implant(s) described and illustrated herein. For example, a method can include: (I) coupling or decoupling an implant (e.g., implant 10) with a patient's bone, and (II) imaging the bone with MM and/or X-ray imaging after the coupling or decoupling. After imaging, the method can further include: (III) either (a) adjusting an already coupled implant (e.g., implant 10) or (b) decoupling the already coupled implant (e.g., implant 10) based on feedback from the imaging process.

As noted herein, the implants and associated methods described herein enable effective feedback on bone adjustment procedures, which can reduce treatment times and complications associated with bone adjustment procedures. The various disclosed implementations can improve patient outcomes when compared with conventional implants, for example, enabling more aggressive adjustment profiles (when warranted), increasing adaptability in adjusting bone positioning, and/or enhancing both intraoperative and post-operative engagement with the device. When compared with conventional approaches, the load-sensing implants described according to various implementations provide an efficient mechanism for bone adjustment and feedback on adjustment procedures. The implants described according to various implementations can also reduce health risks for patients when compared with conventional approaches, for example, allowing an implant to provide adjustment feedback with less exposure to imaging.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

Commonly labeled components in the FIGURES are considered to be substantially equivalent components for the purposes of illustration, and redundant discussion of those components is omitted for clarity.

While inventive features described herein have been described in terms of preferred embodiments for achieving the objectives, it will be appreciated by those skilled in the art that variations may be accomplished in view of these teachings without deviating from the spirit or scope of the invention. Also, while this invention has been described according to a preferred use in spinal applications, it will be appreciated that it may be applied to various other uses desiring surgical fixation, for example, the fixation of long bones.

Various example embodiments of devices (e.g., implants) and techniques for moving bone in a patient's body are described herein. In the interest of clarity, not all features of an actual implementation are necessarily described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure. The implants and related systems, program products and methods described herein boast a variety of inventive features and components that warrant patent protection, both individually and in combination.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

A number of implementations have been described. Nevertheless, it will be understood that additional modifications may be made without departing from the scope of the inventive concepts described herein, and, accordingly, other implementations are within the scope of the following claims.

We claim:

1. An implant for moving bone in a patient's body, the implant comprising:
    an implantable biocompatible housing having a longitudinal axis;

a first adjustment rod at least partially overlapping the implantable biocompatible housing;
a driver configured to drive the first adjustment rod to enable movement of the first adjustment rod relative to the implantable biocompatible housing;
a load sensor positioned within the implantable biocompatible housing and configured to indicate a load applied by the driver on the first adjustment rod, wherein the implantable biocompatible housing has a non-circular cross-section perpendicular to the longitudinal axis that limits rotation of the load sensor; and
a wedge lock positioned within the implantable housing and configured to be engaged to transfer tension to the load sensor when the implant is in tensile mode
wherein the load sensor includes a bi-directional load sensor coupled with the driver and configured to indicate both a compressive load and a tensile load applied by the driver to the first adjustment rod, wherein the load sensor is rotationally fixed relative to the implantable biocompatible housing.

2. The implant of claim 1, wherein the implant is configured to be wirelessly communicatively coupled to an external control device for transmitting data from the load sensor, wherein the implant comprises a wireless transmitter and one or more processors configured to cause the wireless transmitter to transmit data from the load sensor.

3. The implant of claim 1,
wherein the implantable biocompatible housing comprises a first cavity defining an opening;
wherein the first adjustment rod is at least partially disposed within the first cavity;
wherein the driver is positioned between the load sensor and the opening.

4. The implant of claim 1, wherein the driver includes a magnetic actuator configured to be actuated by a magnetic field external to the patient's body, wherein the implant has a proximal end and a distal end, wherein the driver further includes a driven gear system coupled with the magnetic actuator, wherein the load sensor is proximal to the driver, and wherein the driven gear system is distal to the load sensor.

5. The implant of claim 1, wherein the load sensor includes a button-type load cell.

6. The implant of claim 1, wherein the load sensor is configured to monitor the load applied by the driver on the first adjustment rod during adjustment of the first adjustment rod.

7. The implant of claim 1, the implant further comprising a coupler holding the load sensor in the portion of the implantable biocompatible housing, wherein the load sensor includes a bi-directional load sensor coupled with the driver and configured to indicate both a compressive load and a tensile load applied by the driver to the first adjustment rod.

8. The implant of claim 1, wherein a proximal end of the first adjustment rod engages a lead screw and is configured to move with the lead screw.

9. The implant of claim 1, wherein the implant is an intermedullary implant, and wherein the implant is configured to aid in treatment of a limb length discrepancy or a bone defect in the patient's body.

10. A method of intermedullary adjustment of a patient's bone comprising inserting the implant of claim 1 into said bone.

11. An implant for moving bone in a patient's body, the implant comprising:
an implantable biocompatible housing having a first cavity;
a first adjustment rod at least partially contained within the first cavity;
a driver configured to drive the first adjustment rod to enable movement relative to the implantable biocompatible housing, wherein the driver includes:
a magnetic actuator configured to be actuated by a magnetic field external to the patient's body; and
a driven gear system coupled with the magnetic actuator;
a load sensor positioned between the driven gear system of the driver and the first adjustment rod, the load sensor for indicating a load applied by the driver on the first adjustment rod, wherein the implantable biocompatible housing has a non-circular cross-section perpendicular to the longitudinal axis that limits rotation of the load sensor; and
a wedge lock positioned within the implantable housing and configured to be engaged to transfer tension to the load sensor when the implant is in tensile mode.

12. The implant of claim 11, wherein the load cell is configured to rotate with the driver relative to the implantable biocompatible housing.

13. The implant of claim 11, wherein the load sensor includes a bi-directional load sensor coupled with the driver and configured to indicate both a compressive load and a tensile load applied by the driver to the first adjustment rod.

14. The implant of claim 11, wherein a proximal end of the first adjustment rod engages a lead screw and is configured to move with the lead screw.

15. The implant of claim 11, wherein the implant is configured for intermedullary placement in a patient, and wherein the implant is configured to aid in treatment of a limb length discrepancy or a bone defect in the patient's body.

16. A method of intermedullary adjustment of a patient's bone using the implant of claim 11.

17. A method comprising:
causing an implanted distraction device to expand using an external control device, wherein the implanted distraction device includes:
an implantable biocompatible housing and a load sensor positioned within the implantable biocompatible housing, and a wedge lock positioned within the implantable housing and configured to be engaged to transfer tension to the load sensor when the implant is in tensile mode, wherein the implantable biocompatible housing has a non-circular cross-section perpendicular to the longitudinal axis that limits rotation of the load sensor;
measuring load sensor data with a load sensor of the implanted distraction device; and
determining, using the load sensor data, an amount of movement of bone in the patient's body
wherein the load sensor enables determination of the amount of movement of bone in the patient's body without imaging of the bone in the patient's body, and
wherein the external control device is located proximate to the patient's body during expansion of the implanted distraction device, or remote relative to the patient's body during expansion of the implanted distraction device.

18. The method of claim 17, wherein determining the amount of movement of the bone in the patient's body includes converting the load sensor data into an estimated bone movement value, wherein the estimated bone movement value compensates for a margin of error.

* * * * *